US011950727B1

(12) United States Patent
Partiyeli

(10) Patent No.: US 11,950,727 B1
(45) Date of Patent: Apr. 9, 2024

(54) CORN ROASTER

(71) Applicant: Farshid Partiyeli, Los Angeles, CA (US)

(72) Inventor: Farshid Partiyeli, Los Angeles, CA (US)

(*) Notice: Subject to any disclaimer, the term of this patent is extended or adjusted under 35 U.S.C. 154(b) by 863 days.

(21) Appl. No.: 17/018,989

(22) Filed: Sep. 11, 2020

Related U.S. Application Data

(63) Continuation-in-part of application No. 16/044,246, filed on Jul. 24, 2018, now Pat. No. 10,925,437.

(60) Provisional application No. 62/899,120, filed on Sep. 11, 2019, provisional application No. 62/536,406, filed on Jul. 24, 2017.

(51) Int. Cl.
*A47J 37/06* (2006.01)
*A47J 27/00* (2006.01)
*A47J 36/20* (2006.01)
*H05B 1/02* (2006.01)
*H05B 3/46* (2006.01)

(52) U.S. Cl.
CPC ............. *A47J 37/06* (2013.01); *A47J 27/004* (2013.01); *A47J 36/20* (2013.01); *A47J 37/0611* (2013.01); *A47J 37/0688* (2013.01); *H05B 1/0261* (2013.01); *H05B 3/46* (2013.01)

(58) Field of Classification Search
CPC ................ A47J 37/0688; A47J 37/0611; A47J 37/0864; A47J 37/08
USPC .......................................... 99/389, 391, 441
See application file for complete search history.

(56) References Cited

U.S. PATENT DOCUMENTS

| | | | | |
|---|---|---|---|---|
| 2,329,937 | A | * | 9/1943 | Orkfritz ............... A47J 37/0688 99/335 |
| 2,450,563 | A | | 10/1948 | Rommel |
| 3,669,002 | A | * | 6/1972 | Davidson ............ A47J 37/0814 99/441 |
| 3,792,653 | A | | 2/1974 | Davidson |
| 4,450,758 | A | | 5/1984 | Belinkoff |
| 5,855,164 | A | | 1/1999 | Chiang |
| 5,865,098 | A | | 2/1999 | Anelli |
| 8,714,077 | B2 | | 5/2014 | Roake |
| 2006/0249506 | A1 | | 11/2006 | Robertson |
| 2007/0267403 | A1 | | 11/2007 | Bonsol |
| 2009/0277339 | A1 | | 11/2009 | Andrade |
| 2014/0109773 | A1 | | 4/2014 | Deshpande |
| 2016/0088974 | A1 | * | 3/2016 | Tran .................... A47J 37/0688 99/441 |

FOREIGN PATENT DOCUMENTS

WO      2013057738      4/2013

* cited by examiner

*Primary Examiner* — Reginald Alexander
(74) *Attorney, Agent, or Firm* — Jafari Law Group, Inc.

(57) ABSTRACT

The invention involves an electrical corn-on-the-cob roaster including a repository with a cavity having a structure that generally forms a plurality of cylindrical tubes for receiving a plurality of cobs of corn. In exemplary embodiments, a corn roaster assembly includes a cover concealing a heating element, a repository including a cavity defined by the heating element, and a removable cage forming a plurality of cylindrical receptacles, each of the plurality of cylindrical receptacles configured to receive a cob of corn. To improve heating or roasting the cob of corn a polygonal, circular, or semi-circular configuration of heating panels may be dispose about a heating chamber so as to maximize heat for roasting the corn but minimizing heat on the casing or cover surrounding the heating element.

11 Claims, 18 Drawing Sheets

FIG. 10
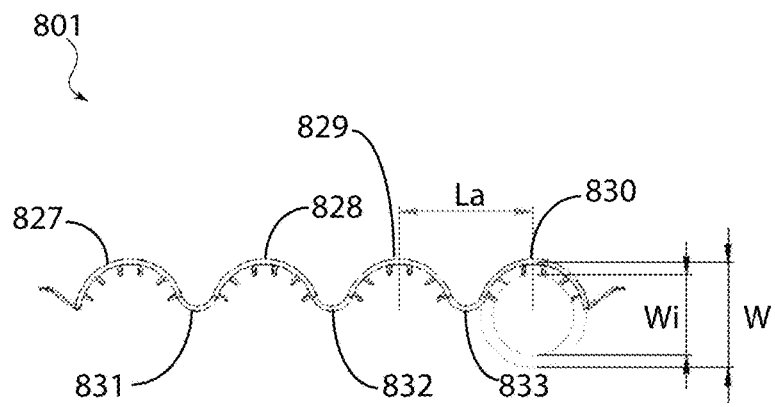
FIG. 11
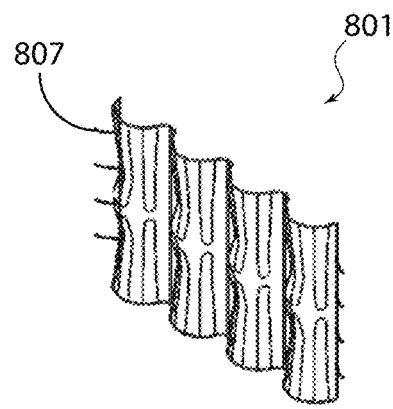
FIG. 12
FIG. 13
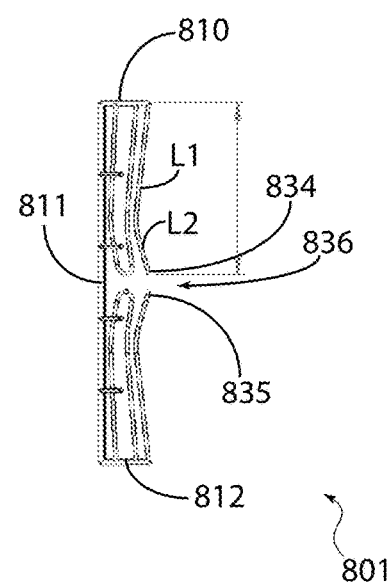

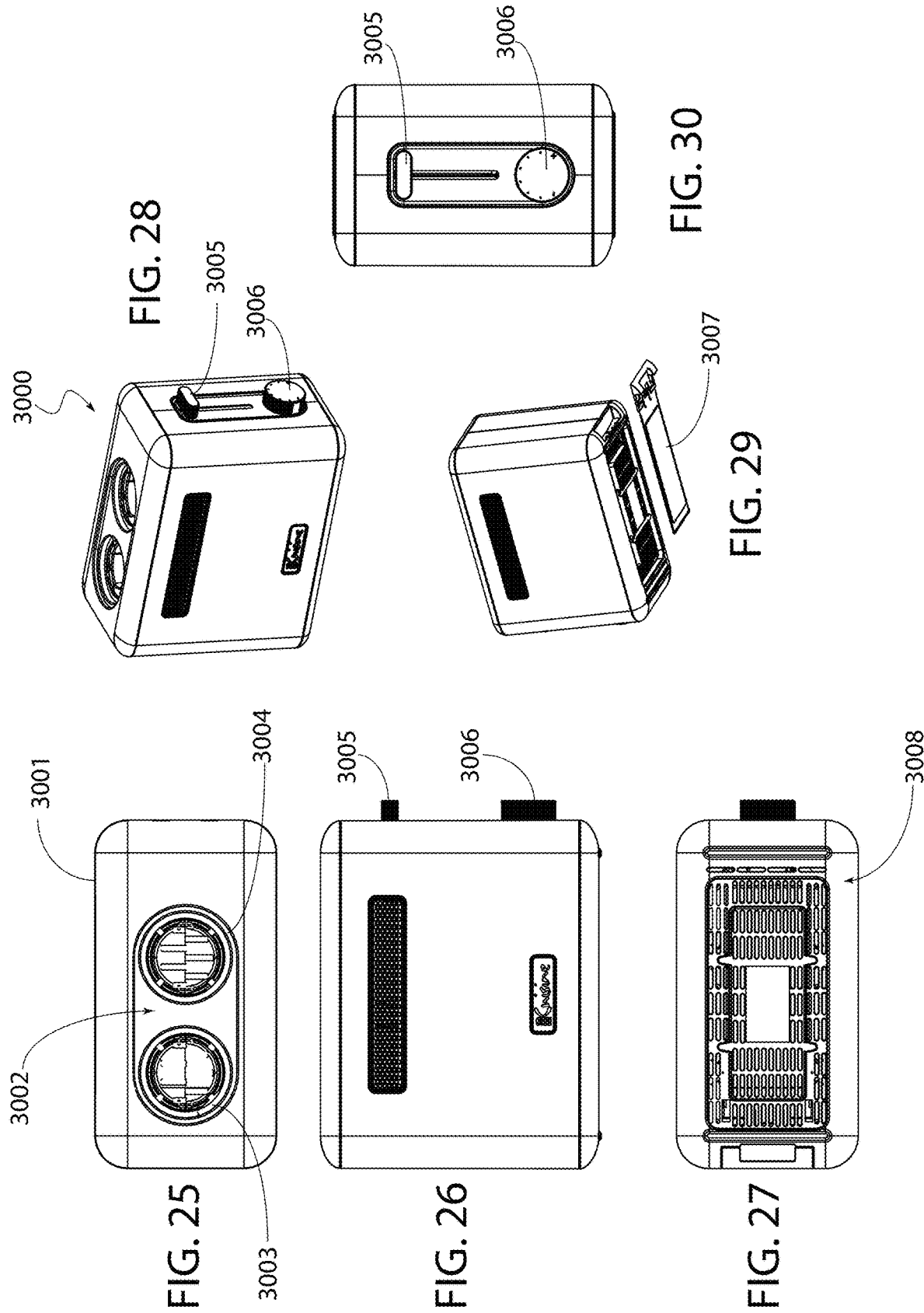

CORN ROASTER

BENEFIT OF PRIOR RELATED APPLICATIONS

The present application claims priority under 35 U.S.C. § 119(e) to U.S. Provisional Patent Application Ser. No. 62/899,120 filed on Sep. 11, 2019, and is a continuation-in-part application of U.S. Non-provisional application Ser. No. 16/044,246, filed on Jul. 24, 2018, which claims priority under 35 U.S.C. § 119(e) to U.S. Provisional Patent Application Ser. No. 62/536,406 filed on Jul. 24, 2017, the disclosure of which are incorporated herein by reference in their entirety.

TECHNICAL FIELD OF THE INVENTION

The present invention relates generally to an improved corn roaster. More specifically, the present invention relates to a corn roaster including structural elements configured for receiving individual whole corn cobs and roasting corn on the cob.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Appliances for cooking food items are well known, and different appliances have been taught by the prior art to facilitate the cooking of food items. Different food item preparations often require distinct types of cooking apparatus, depending on the manner in which a food item is desirably prepared. For example, a particular food item may be grilled, roasted, slow-cooked, or boiled—just to name a few types or methods of cooking a food item. Accordingly, the prior art is vast with different appliances for cooking distinct types of food. One food item that is often cooked is corn, and more particularly corn on the cob.

There are a few teachings in the prior art for devices that facilitate cooking corn. U.S. Pat. No. 2,450,563 to Rommel teaches an electrically heated roaster that includes an oven of cylindrical form, comprising a cover and a base. The base portion includes two supporting rods that are disposed in the same horizontal plane, and parallel with and at equal distances from the axial center of the oven. The location of these rod is such that if an ear of corn of ordinary size is laid thereon lengthwise of the oven, it will substantially axially coincide with the oven axis. One problem with this device is that the corn is not typically evenly roasted as a result of it laying down horizontally. Another problem is the inadequacy of the heating element used in this older device. More importantly, there is no device such as a cage or frame that properly holds the corn in place to evenly and properly roast the corn on the cob.

U.S. Patent Publication 2014/0109773 to Deshpande discloses a device for roasting corn that includes multiple corn on the cob receptacles. That document discloses a device for roasting food, especially corn-on-cob. The device comprises one or more cylindrical heating chambers adapted in a housing for roasting a corn-on-cob electrically, a holding means to hold the corn-on-cob inside the heating chamber, and a controller means for controlling heating and setting a time duration for roasting the corn-on-cob in the chamber. Very little is taught bay way of how the corn on the cob is properly held in place.

Similarly, U.S. Patent Publication 2007/0267403 A1 to Bonsol discloses an electrical appliance with cylindrical receptacles. That device is an electrical appliance that uses electrical current to uniformly heat up cylindrical objects, including corn. The position holder on that device does not properly hold a corn on the cob in place and does not easily accommodate different sizes of corn without sacrificing uniform heating.

Another problem with these prior art devices is that the heating elements are not efficient. Part of the problem is the heating element itself that is commonly implemented in prior art devices. Part of the problem is also the frame structure or rack design in which the corn is placed about the heating elements, which tend to be inefficient for evenly roasting the corn.

Therefore, there exists a previously unappreciated or inadequately-met need for a new and improved corn roaster.

It is to these ends that the present invention has been developed.

SUMMARY OF THE INVENTION

To minimize the limitations in the prior art, and to minimize other limitations that will be apparent upon reading and understanding the present specification, the present invention describes a corn on the cob roaster.

Generally, the invention involves an electrical corn on the cob roaster assembly including a repository defined by a cavity having a structure that generally forms a plurality of cylindrical tubes for receiving a plurality of cobs of corn. The cavity houses a heating element and a rack for supporting each of the plurality of corn cobs therein. The heating element may be disposed on an outer boundary of the rack so that each cob of corn is individually exposed to the heating element. The rack may have a support structure comprising of a plurality of receptacles, each receptacle with or without spring elements for securing each cob of corn therein. In exemplary embodiments, a corn roaster assembly includes a cover concealing a heating element, a repository including a cavity defined by the heating element, and a removable cage forming a plurality of cylindrical receptacles, each of the plurality of cylindrical receptacles configured to receive a cob of corn. The removable cage may include a first metallic cage component having a first set of semicircular apertures, and a second metallic cage component having a second set of semicircular apertures. When aligned, the first and second metallic cage components form the plurality of cylindrical receptacles in-between the first and second set of semicircular apertures.

A corn roaster assembly, in accordance with some exemplary embodiments of the present invention, may include: a cover that conceals a heating element; a repository including a cavity substantially defined by the heating element; and a rack removably situated within the cavity, including a frame with a plurality of cylindrical receptacles, each configured to receive a cob of corn.

In accordance with some exemplary embodiments of the present invention, a corn roaster assembly may include: a cover that conceals a heating element and a circuitry to control the heating element; a repository including a cavity substantially defined by the heating element and one or more lateral supports; and a rack removably coupled to the lateral supports, including a frame with a plurality of cylindrical receptacles, each configured to receive a cob of corn, wherein the rack is configured to slide vertically in and out of the cavity.

In accordance with some exemplary embodiments of the present invention, a corn roaster assembly may include: a cover that conceals a heating element; a repository including a cavity substantially defined by the heating element; and a rack situated within the cavity, including a removable cage forming a plurality of cylindrical receptacles, each of the plurality of cylindrical receptacles configured to receive a cob of corn, the removable cage forming the plurality of cylindrical receptacles including: a first metallic cage component having a first set of semicircular apertures across a length of the first metallic cage component; and a second metallic cage component having a second set of semicircular apertures across a length of the second metallic cage component, the first and second metallic cage components aligned within the cavity of the repository to form the plurality of cylindrical receptacles in-between the first and second set of semicircular apertures.

In accordance with some exemplary embodiments of the present invention, a corn roaster assembly may include: a cover that conceals a heating element; a repository including a cavity substantially defined by the heating element; and a rack situated within the cavity, including a removable cage forming a plurality of cylindrical receptacles, each of the plurality of cylindrical receptacles configured to receive a cob of corn, the removable cage forming the plurality of cylindrical receptacles including: a first metallic cage component having a first set of semicircular apertures across a length of the first metallic cage component; and a second metallic cage component having a second set of semicircular apertures across a length of the second metallic cage component, the first and second metallic cage components aligned within the cavity of the repository to form the plurality of cylindrical receptacles in-between the first and second set of semicircular apertures; wherein each of the first and second metallic cage components comprises: a top frame including a plurality of curves joined together to form the first and second plurality of semicircular apertures, respectively; a bottom frame running parallel to the top frame; a plurality of vertical supports perpendicular to and connecting the top frame and the bottom frame; and a first plurality of prongs extending inwardly between the top frame and the bottom frame.

In accordance with some exemplary embodiments of the present invention, a corn roaster assembly may include: a cover that conceals a heating element; a repository including a cavity substantially defined by the heating element; and a rack situated within the cavity, including a removable cage forming a plurality of cylindrical receptacles, each of the plurality of cylindrical receptacles configured to receive a cob of corn, the removable cage forming the plurality of cylindrical receptacles including: a first metallic cage component having a first set of semicircular apertures across a length of the first metallic cage component; and a second metallic cage component having a second set of semicircular apertures across a length of the second metallic cage component, the first and second metallic cage components aligned within the cavity of the repository to form the plurality of cylindrical receptacles in-between the first and second set of semicircular apertures; wherein each of the first and second metallic cage components comprises: a top frame including a plurality of top curves, wherein each top curve of the top frame has a first diameter; a bottom frame including a plurality of bottom curves, wherein each bottom curve of the bottom frame has a second diameter that is smaller than the first diameter; and a plurality of radiating vertical supports connecting each of the plurality of bottom curves with corresponding each of the plurality of top curves of the top frame, such that the plurality of cylindrical receptacles in-between the first and second set of semicircular apertures are conically shaped.

In accordance with some exemplary embodiments of the present invention, a corn roaster assembly may include: a cover enclosing a cavity having a plurality of cylindrical receptacles, each of the plurality of cylindrical receptacles configured to receive a cob of corn; a heating element formed from a plurality of semicircular heating cartridge assemblies, each heating cartridge assembly (HCA) of the plurality of semicircular heating cartridge assemblies, including: a heating element assembly; a heat shield; a cage assembly; and a cap configured to receive a portion of the heating element assembly, the heat shield, and the cage assembly, wherein the heating element assembly is sandwiched between the heat shield and the cage assembly, and wherein complementary HCAs of the plurality of semicircular heating cartridge assemblies form each of the plurality of cylindrical receptacles.

It is an objective of the present invention to provide an improved corn roaster that allows a user to easily roast one or more corns on the cob.

It is another objective of the present invention to provide an improved heating element for roasting corn on the cob.

It is yet another objective of the present invention to provide an improved holding mechanism for securing one or more corn cobs to properly roast corn on the cob.

It is yet another objective of the present invention to provide a corn on the cob roaster assembly that is efficient and easy to use.

These advantages and features of the present invention are not meant as limiting objectives, but are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows:

FIG. 10 illustrates a top view of a corn-support cage component, in accordance with an exemplary embodiment of the present invention.

FIG. 11 illustrates a perspective view showing the exterior portion of a corn-support cage component, in accordance with an exemplary embodiment of the present invention.

FIG. 12 illustrates a front view of a corn-support cage component, in accordance with an exemplary embodiment of the present invention.

FIG. 13 illustrates a side view of a corn-support cage component, in accordance with an exemplary embodiment of the present invention.

FIG. 25-FIG. 30 illustrate several views of a corn roaster assembly in accordance with one exemplary embodiment of the present invention.

DETAILED DESCRIPTION OF THE INVENTION

Figure 1:
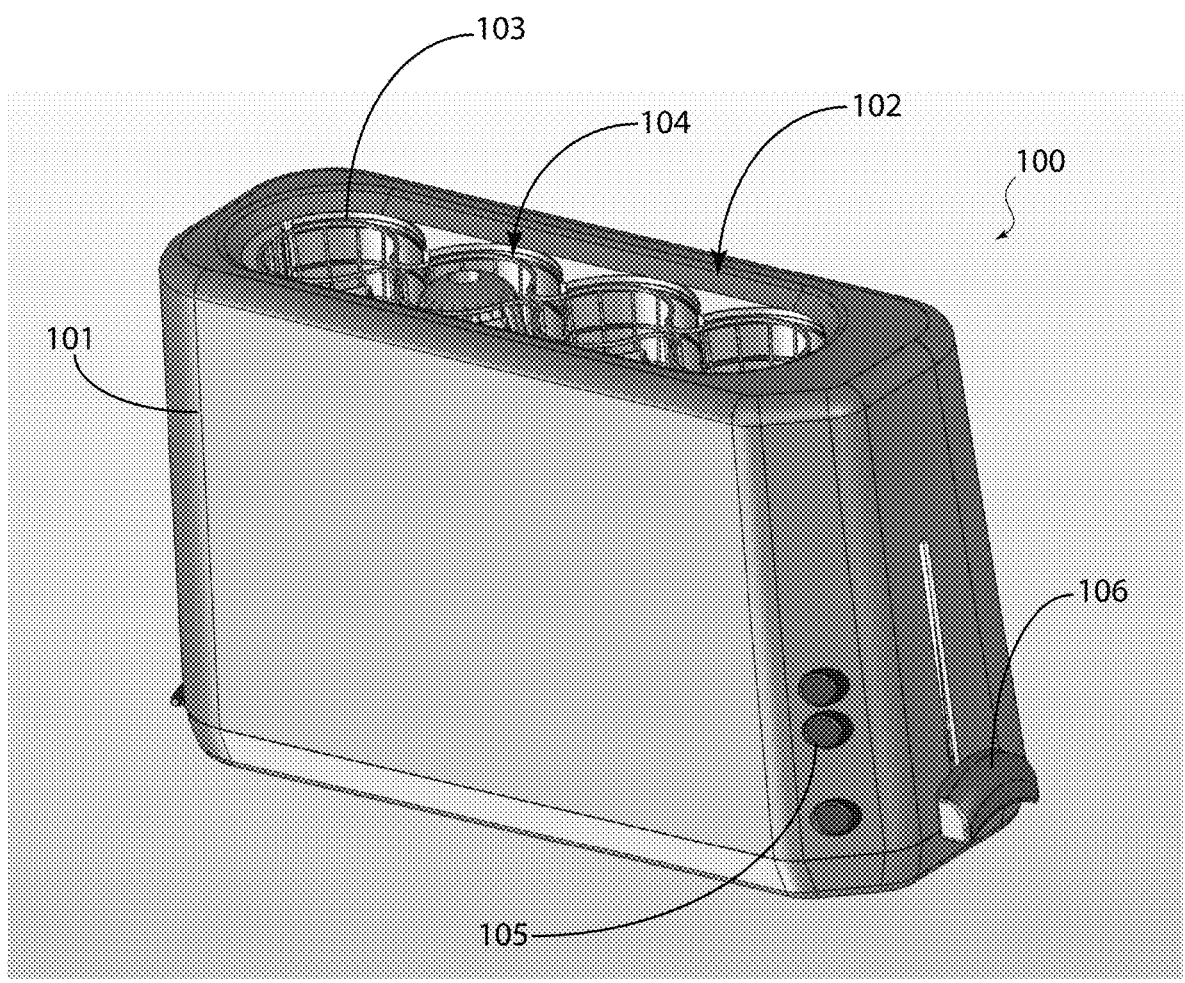
FIG. 1 illustrates a perspective view of a corn roaster assembly in accordance with one exemplary embodiment of the present invention.

In the following discussion that addresses a number of embodiments and applications of the present invention, reference is made to the accompanying figures, which form a part thereof. Depictions are made, by way of illustration, of specific embodiments in which the invention may be practiced; however, it is to be understood that other embodiments may be utilized and changes may be made without departing from the scope of the present invention. Whenever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components, and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments, whether these features, elements, and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, an electrical corn-on-the-cob roaster including a repository with a cavity having a structure that generally forms a plurality of cylindrical tubes for receiving a plurality of cobs of corn. Exemplary embodiments of the present disclosure are described with reference to the drawings for illustration purposes and are not intended to limit the scope of the present disclosure.

Turning now to the figures, FIG. 1 illustrates a perspective view of a corn roaster assembly in accordance with one exemplary embodiment of the present invention. More specifically, FIG. 1 illustrates a corn roaster assembly 100 including a cover 101 having a repository 102 that encloses a rack including a corn-supporting cage 103 within a cavity 104 having a structure that generally forms a plurality of cylindrical tubes for receiving a plurality of cobs of corn. Furthermore, assembly 100 typically includes a knob 105 for lifting and lowering the cobs within the repository, and control knobs 106 for adjusting cooking settings. Such adjustable cooking settings may include, without limitation, cooking temperature and cooking time, for example.

Figure 2:
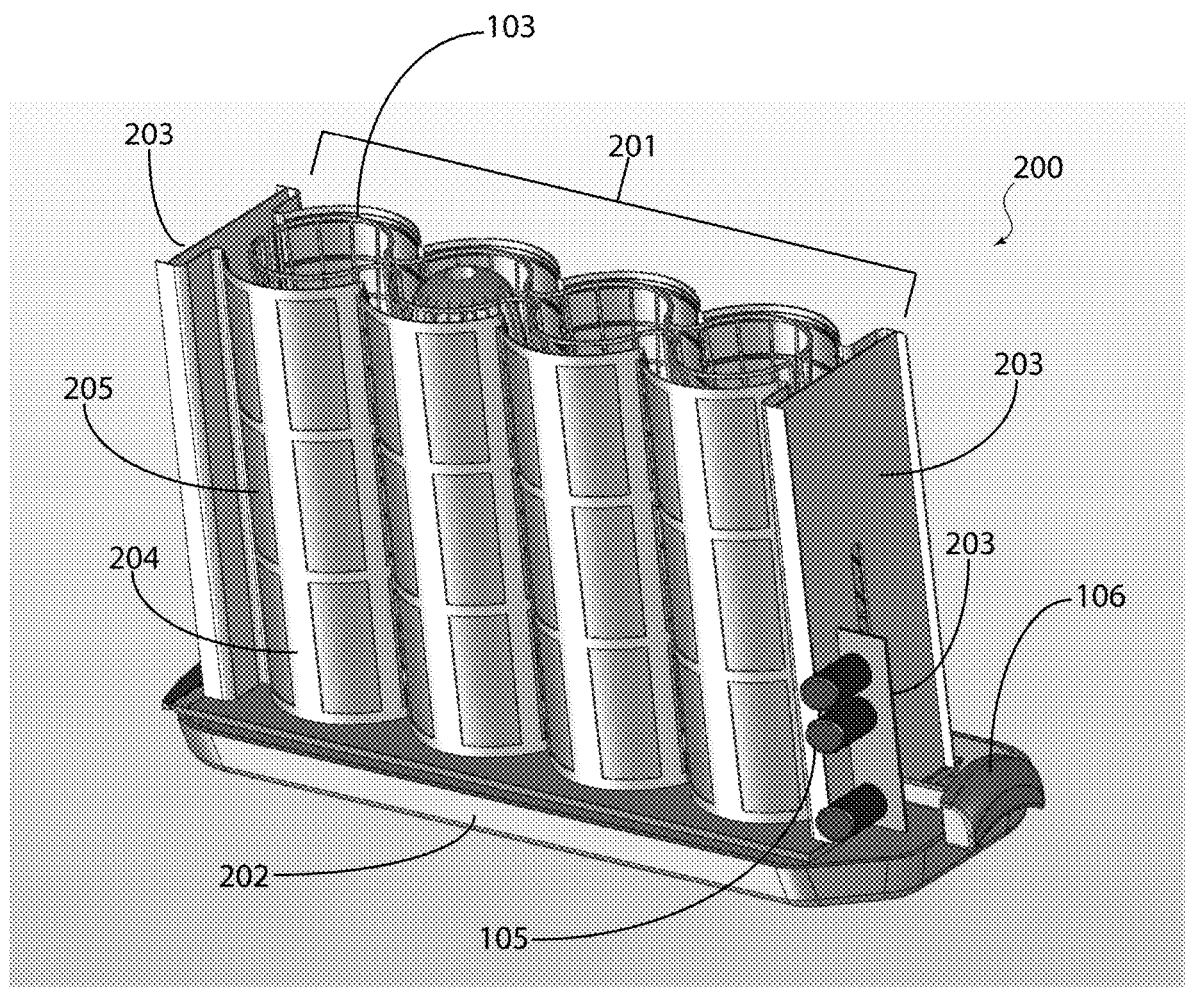
FIG. 2 illustrates a perspective view of the heating element of the corn roaster assembly, a cover of the assembly removed.

FIG. 2 illustrates a perspective view of a rack 200 that includes a heating element 201 of the corn roaster assembly 100, wherein cover 101 of the assembly is shown removed thereby exposing rack 200. More specifically, rack 200 includes heating element 201, held together in place or secured to a base 202 of assembly 100 via side support panels 203, which secure metallic cage 103 within cavity 104 of the assembly 100.

The heating element 201 comprises a set of heating panels 205 which are positioned outside cylindrical corn-support cage 103. In this illustration the heating panels 205 are curved to wrap around the corn-support cage 103, each of the heating panels 205 embedded within a metallic structure 204 that conducts electricity and thus heat to the heating panels 205. Of course, and without limiting the scope of the present invention, a flat heating panel or multiple flat heating panels could also be used without deviating from the scope of the invention. The heating panels 205 may be made with any thermal conductive material such as metal or ceramic material. Furthermore, heating technologies may be implemented, including but not limited to infra-red heating technologies.

As mentioned above, side support panels 203 are configured to support metallic cage 103 in-between and secured against base 202. Moreover, side support panels 203 (or at least one of a pair of side support panels 203) may be utilized to support a control circuitry 206 for controlling a temperature, timing or other adjustable cooking settings that may be desired. In some exemplary embodiments, control circuitry provides a digital user interface to control the heating element 201, a timer or any other essential functions of the corn roaster assembly 100. In some exemplary embodiments, control circuitry provides a simple potentiometer for providing a manual knob or manual means of controlling the heating element 201, a timer or any other essential functions of the corn roaster assembly 100.

Figure 3A:
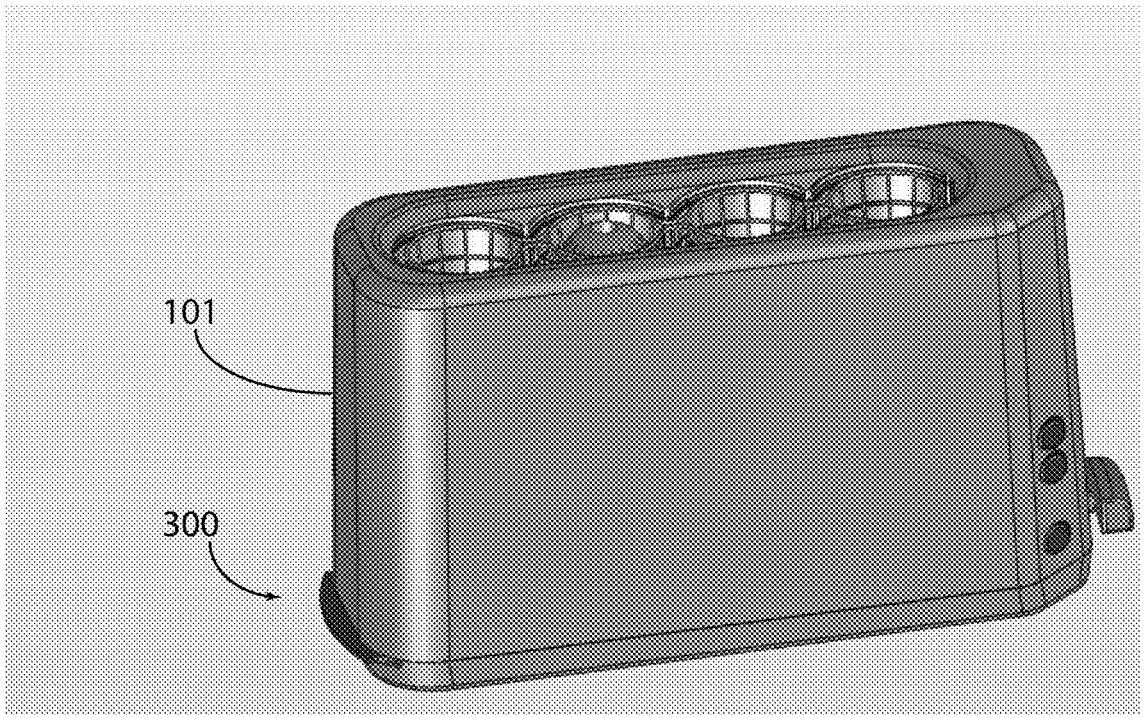
FIG. 3(a) illustrates a perspective view of a corn roaster assembly in accordance with one exemplary embodiment of the present invention.

Turning now to the following set of figures, FIG. 3(a) illustrates a perspective view of a corn roaster assembly in accordance with one exemplary embodiment of the present invention. FIG. 3(a) shows the corn roaster assembly depicted in FIG. 1 at an angle such that a crumb tray 300 is visible at the bottom part of cover 101 of the roaster assembly 100. Tray 300 typically comprises of a drawer 301 and a pull tab 302 used to easily grip and remove the tray for cleaning. The pull tab 302 may be constructed from a non-thermal conductive material in order to prevent a user from sustaining any burn injuries when removing the tray.

Figure 3B:
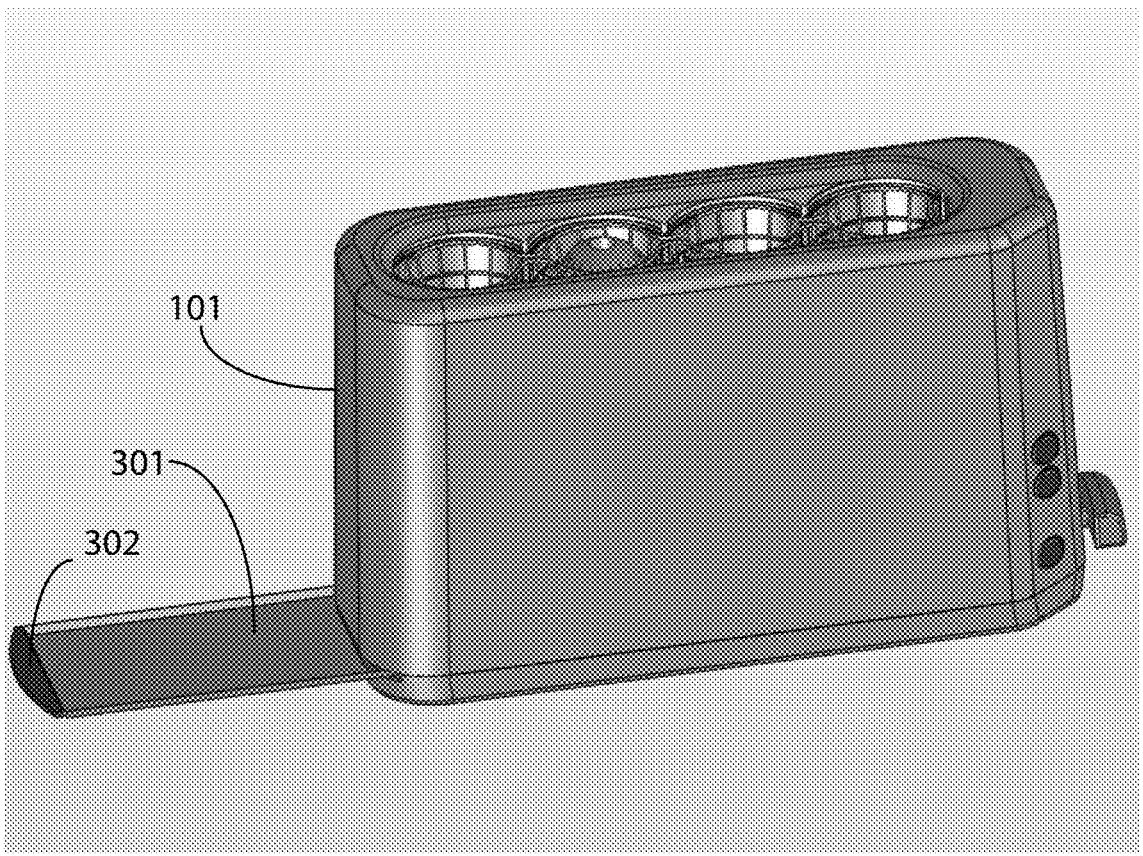
FIG. 3(b) illustrates a perspective view of the corn roaster assembly depicted in FIG. 3(a), with a crumb tray partially removed from its receptacle.

FIG. 3(b) illustrates a perspective view of the corn roaster assembly depicted in FIG. 3(a), with a crumb tray 300 partially removed from its receptacle. The crumb tray 300 registers slidably with a receptacle or drawer 301 at the bottom of the roaster assembly 100. The crumb tray 300 is at the bottom of the roaster assembly so that it may catch any drippings or crumbs that fall from items placed in the roasting assembly cavity. The crumb tray 300 may be made of any material that can withstand high temperatures, such as metal.

Figure 4:
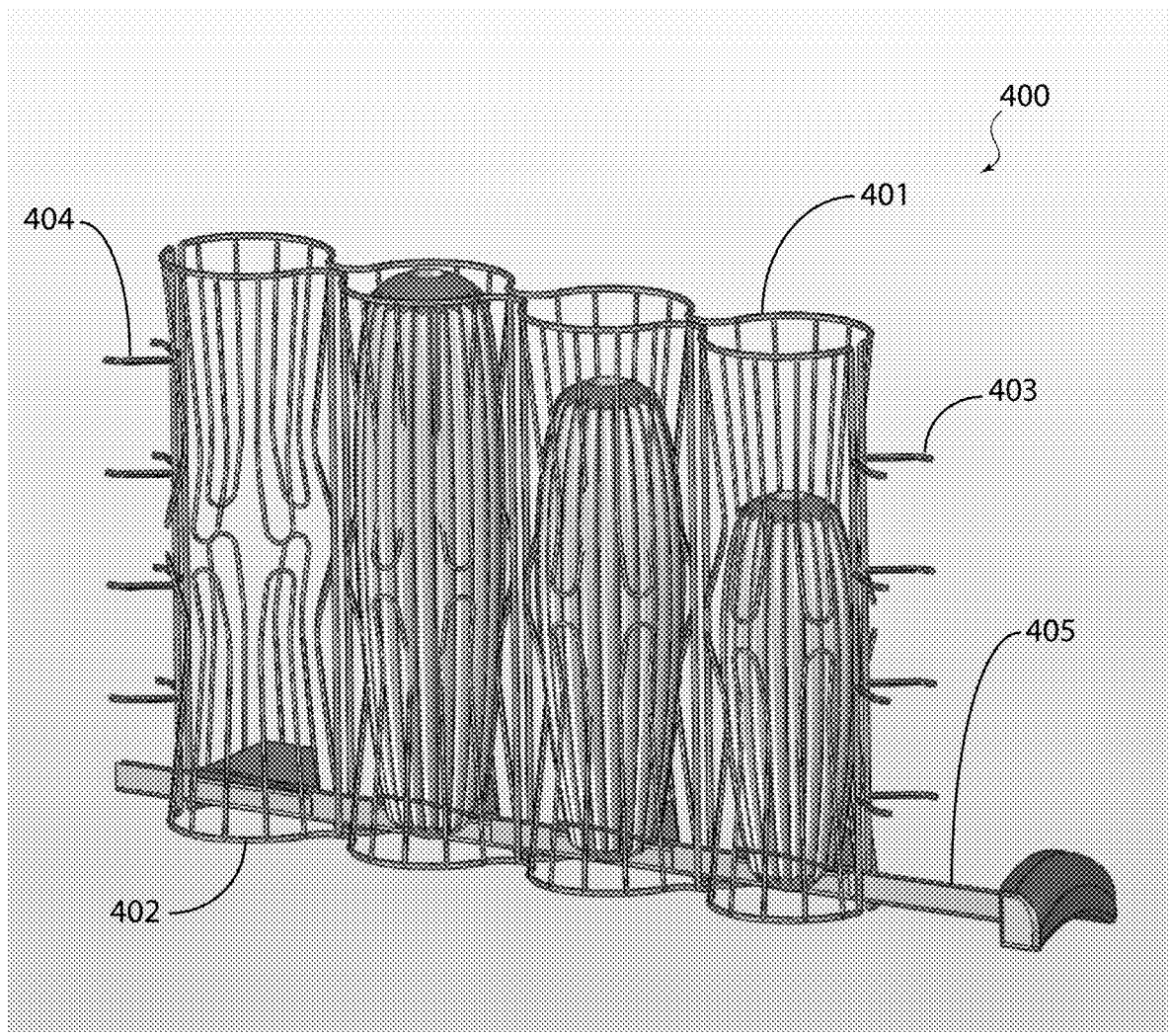
FIG. 4 illustrates a perspective view of a corn-support rack or cage, in accordance with an exemplary embodiment of the present invention.

Turning now to the next set of figures, FIG. 4 illustrates a perspective view of a corn-support cage (cage 400), in accordance with an exemplary embodiment of the present invention. More specifically, cage 400 is shown including a first metallic cage component 401, and a second metallic cage component 402, each metallic cage component 401 and 402 including a set of side supports 403 and 404, respectively, which engage with side support panels 203 of rack 200. Moreover, in this exposed view, it may be appreciated that each metallic cage component 401 and 402 have a set of semicircular apertures across a length of the metallic cage components such that when aligned (as shown) within the cavity 104 of repository 102, a plurality of cylindrical receptacles in-between the first and second set of semicircular apertures are formed.

In some exemplary embodiments, spring elements for securing each cob of corn securely within each cylindrical receptacle may be employed. The spring elements may include structures such as a plurality of prongs situated along a circumference of each cylindrical receptacle (as shown in FIG. 4 and as described in greater detail below with reference to FIG. 10-FIG. 13). Alternatively, other structures suitable for accommodating different size corn cobs may be implemented without deviating from the scope of the present invention, such as a conical structure that is configured to receive and secure a corn on the cob therein (i.e. as discussed in more detail below with reference to FIG. 18-FIG. 21). In either embodiment, these structures further allow for different sized cobs to register within each receptacle, maintaining each corn properly placed and exposed to the heating element such that the corn is evenly cooked. Also shown in FIG. 4, is a support structure or lever 405 that traverses the rack and connects to a knob for lowering and lifting the cobs within the cavity, to expose and remove the cobs from the heat.

Figure 5:
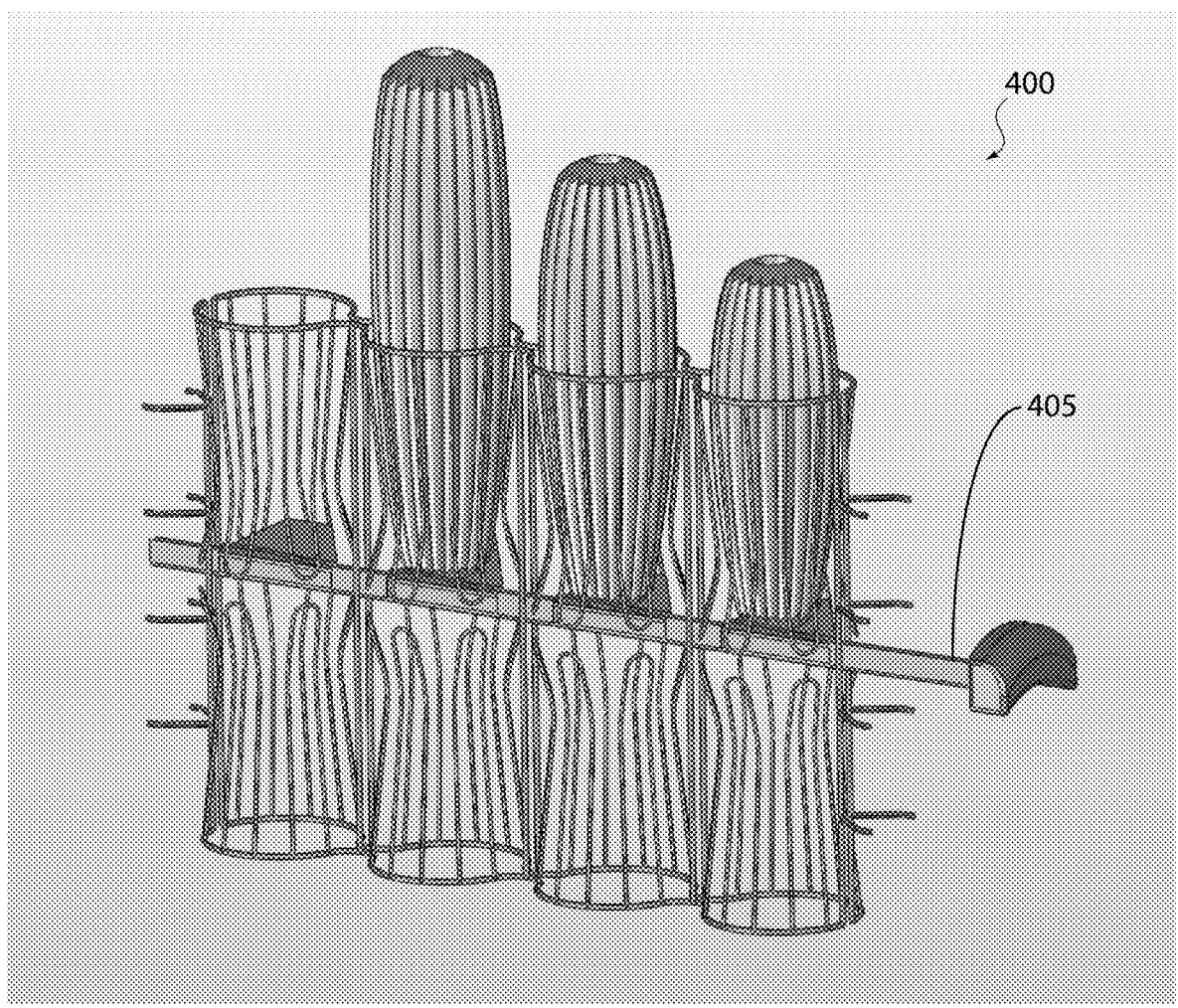
FIG. 5 illustrates a perspective view of a corn-support rack or cage, in accordance with another exemplary embodiment of the present invention.

Turning to the next figure, FIG. 5 illustrates lever 405 traversing the rack, which has been raised so that the corn cobs can be easily removed from the rack. In some exemplary embodiments, this component employs springs commonly used in devices such as toasters and the like. In some exemplary embodiments, the spring component may be triggered or released upon a timer being set off, or a predetermined event that may have been preprogrammed on a control circuitry such as control circuitry 206. As may be appreciated from this view, lever 405 slides vertically along a height of cage 400, and more specifically along a space between cage component 401 and cage component 402.

Figure 6:
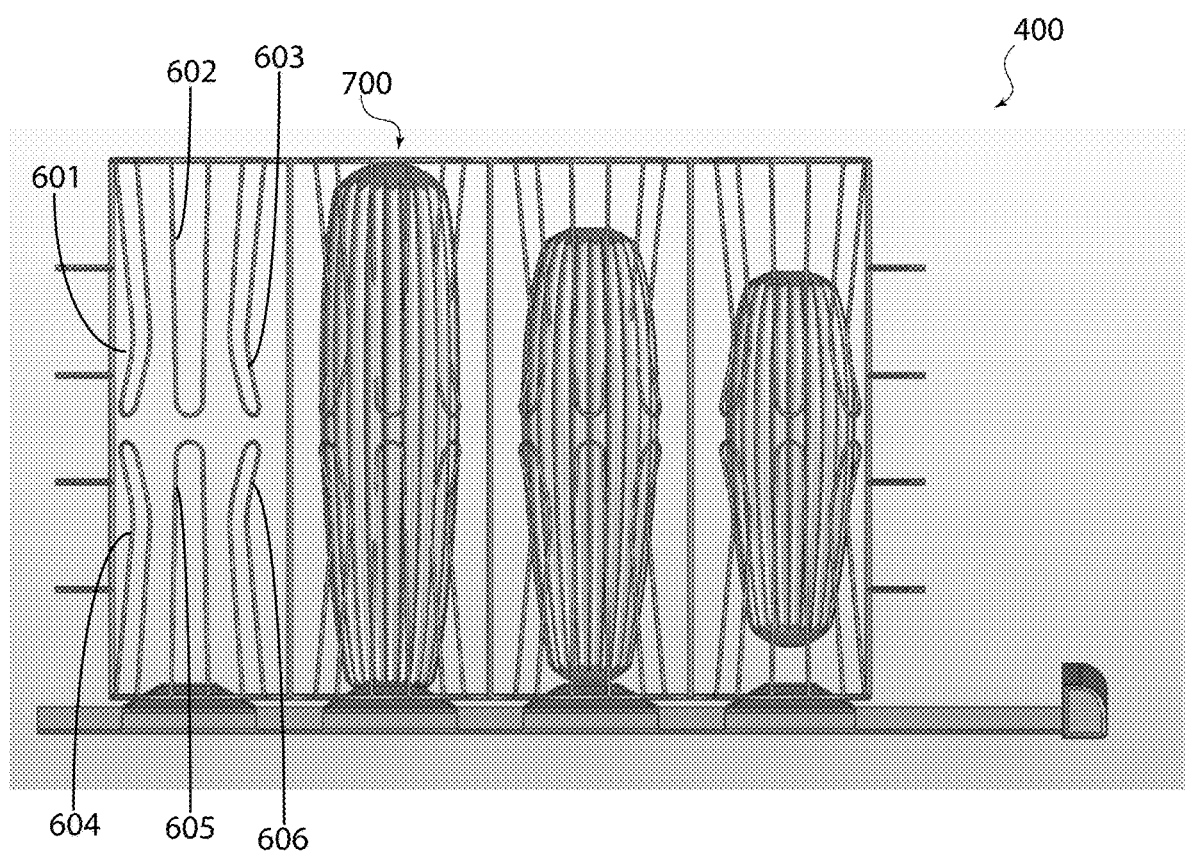
FIG. 6 illustrates a side view of a corn-support cage, in accordance with an exemplary embodiment of the present invention.

Moving on to the next figure, FIG. 6 illustrates a side view of cage 400, in accordance with an exemplary embodiment of the present invention. In this view, several prongs extending from each of the semicircular apertures on the top of each cage component may be appreciated. That is, each of the semicircular apertures of each cage component includes a plurality of prongs—for example the first aperture from the left on this view includes top prongs 601, 602, and 603, and bottom prongs 604, 605, and 606. As mentioned above, these prongs help to secure each corn cob in place such that each cob is in a way suspended within the cavity surrounded by the heating element. In exemplary embodiments, as will be discussed in more detail below, the prongs may be form such that a spring element is provided. This may be achieved, for example and without limiting the scope of the present invention, by providing a bend at or near terminal ends of each prong.

Figure 7:
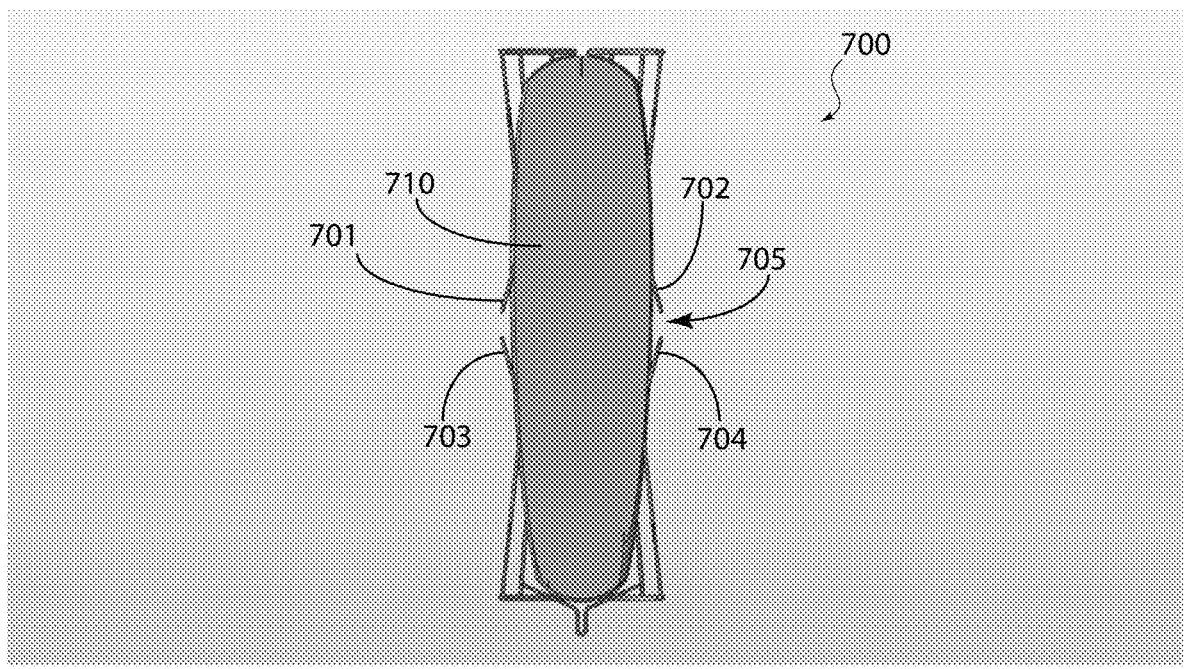
FIG. 7 illustrates a cross-sectional view of a single corn-support cage component, in accordance with an exemplary embodiment of the present invention.

FIG. 7 illustrates a cross-sectional view of a single corn-support cylindrical receptacle, showing how prongs such as top prongs 601, 602, and 603, and bottom prongs 604, 605, and 606, may sustain a corn on the cob therein. More specifically, FIG. 7 depicts a cross-sectional view of the cylindrical receptacle 700 (as shown in FIG. 6) of the plurality of cylindrical receptacles formed by the coupling together of cage components 401 and 402 of cage 400. As may be appreciated from this view, top prongs 701 and 702 extend inwards or downwards towards a center region 705 of cylindrical receptacle 700, except that at terminal ends each of the top prongs 701 and 702 flare outwards. Similarly, bottom prongs 703 and 704 extend inwards or upwards towards center region 705 of cylindrical receptacle 700, except that at terminal ends each of the bottom prongs 703 and 704 flare outwards as well. Accordingly, and as will be disclosed below in more detail, this structure for each prong provides a spring element that enables a user to securely place each corn (such as corn 710) within each cylindrical receptacle of the plurality of cylindrical receptacles such as cylindrical receptacle 700.

Figure 8:
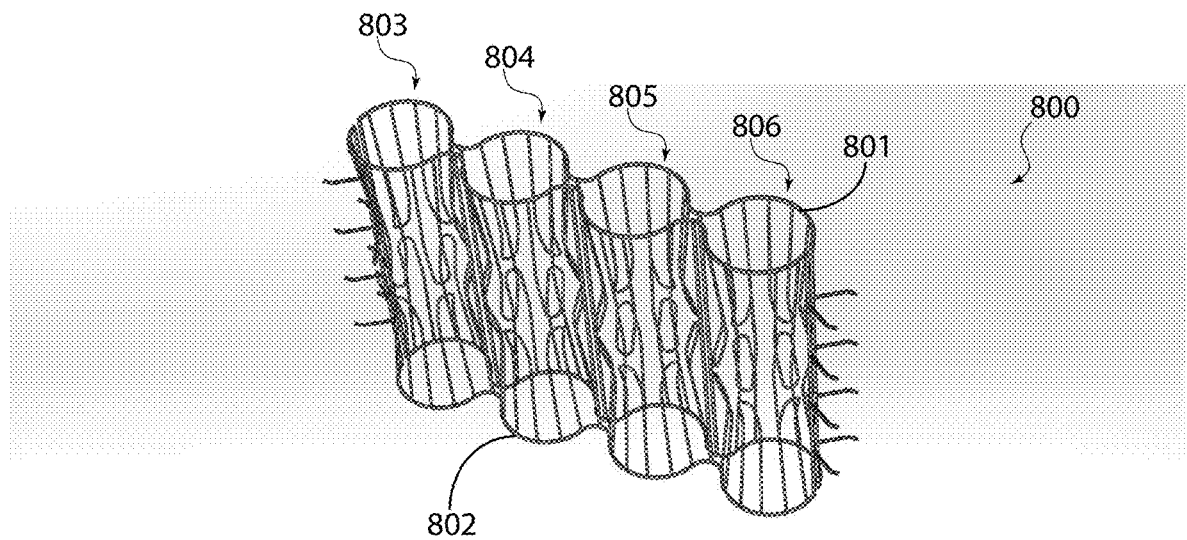
FIG. 8 illustrates a perspective view of a removable corn-support cage, in accordance with an exemplary embodiment of the present invention.
Figure 9:
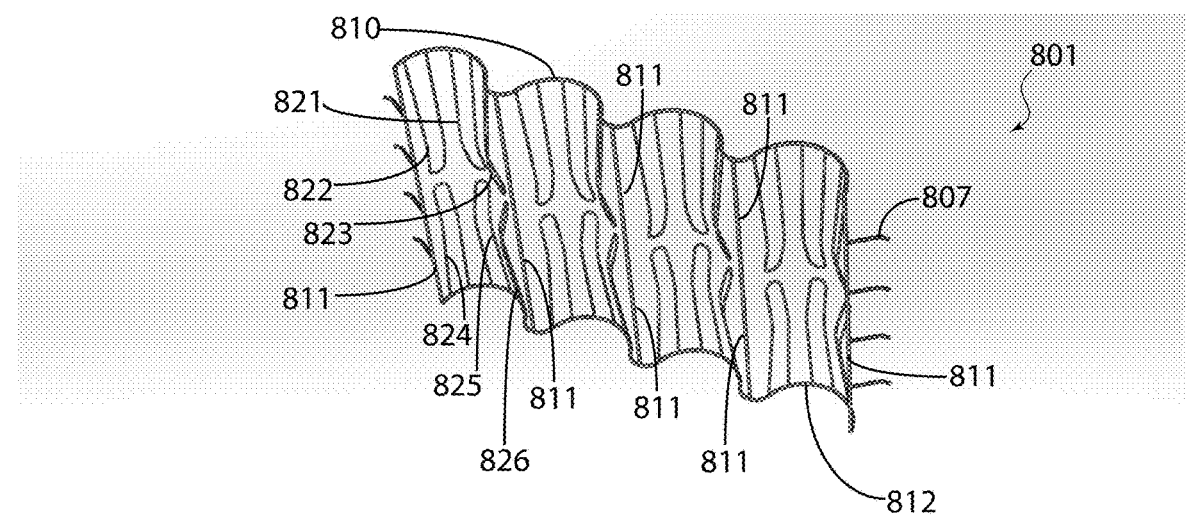
FIG. 9 illustrates a perspective view showing the interior portion of a corn-support cage component, in accordance with an exemplary embodiment of the present invention.

Turning now to the next set of figures, FIG. 8 illustrates a perspective view of a removable corn-support cage, in accordance with an exemplary embodiment of the present invention; and FIG. 9 illustrates a perspective view showing the interior portion of a corn-support cage component, in accordance with the exemplary embodiment of FIG. 8; FIG. 10 illustrates a top view of a cage component 801; FIG. 11 illustrates a perspective view showing the exterior portion of a cage component 801; FIG. 12 illustrates a front view thereof; and FIG. 13 illustrates a side view thereof.

More specifically, these figures show a removable cage 800, which comprises a first metallic cage component 801 having a first set of semicircular apertures formed by a first series of connected curves or arches across a length of the first metallic cage component 801; and a second metallic cage component 802 having a second set of semicircular apertures formed by a second series of connected arches across a length of the second metallic cage component 802, the first and second metallic cage components 801 and 802 configured to be aligned within a cavity of the repository of the corn roaster assembly (such as assembly 100, for example) to form the plurality of cylindrical receptacles 803, 804, 805, and 806, in-between the first and second set of semicircular apertures.

FIG. 9 illustrates a perspective view showing the interior portion of cage component 801, one of the two cage components that forms corn-support cage 800. More specifically, FIG. shows cage component 801 comprising: a top frame 810 having a first set of semicircular apertures formed by a first series of connected arches across a length of the top frame 810; a bottom frame 812 having a second set of semicircular apertures formed by a second series of connected arches across a length of the bottom frame 812; and a plurality of vertical supports 811 perpendicular to and connecting the top frame 810 and the bottom frame 812 of the cage component 801 of cage 800. Moreover, extending from each arch 827, 828, 829, and 830 (see also FIG. 10 for reference) along top frame 810, are a series or first plurality of prongs extending downwardly from the top frame 810 towards center or middle region of the cage 800. For example, from arch 827, a set of prongs including prong 822, prong 821, and prong 823 extend down or towards the center and about half way into cylindrical receptacle 803. Similarly, extending from each arch of bottom frame 812 (each arch shown but not labeled) that corresponds to arches 827, 828, 829, and 830 (see also FIG. 10 for reference), are a series or second plurality of prongs extending upwardly from the bottom frame 812 towards a center or middle region of the cage 800. For example, from the arch formed by bottom frame 812 that is directly below arch 827, a set of prongs including prong 824, prong 825, and prong 826 extend upwards or towards the center and about half way into cylindrical receptacle 803, wherein each prong includes a pair of legs connected at a u-shaped bend substantially at the center of the cage.

FIG. 10 illustrates a top view of cage component 801, from which it may be appreciated that each of the plurality of arches 827, 828, 829, and 830 are typically evenly and equally spaced apart. In some embodiments, each semicircular aperture formed by each of arches 827, 828, 829, and 830 has an equal length and are equidistant such that a distance La is constant between each of arches 827, 828, 829, and 830. Similarly, when cage component 801 and 802 are aligned and or joined within the cavity of the corn roast assembly, a constant spacing between both components may be employed such that an internal width of each aperture Wi is the same for each of the plurality of cylindrical receptacles 803, 804, 805, and 806, formed in-between the first and second set of semicircular apertures of their corresponding cage components 801 and 802. In exemplary embodiments, each component (801 and 802) is substantially identical to the other. From this view, as well as from other views that will be discussed in turn, it may be appreciated that, in exemplary embodiments such as the one shown in FIG. 8-13, the top frame 810 and the bottom frame 812 are substantially identical as well and as such run parallel to each other. For example, a length and a width are substantially the same; each diameter of each arch on the top frame 810 is substantially the same as each diameter of each arch on the bottom frame 812. Accordingly, the top frame 810 and the bottom frame 812 of cage component 801 may line up as seen in FIG. 10, in exemplary embodiments. Furthermore, from this view, it may be appreciated that in some exemplary embodiments, each arch 827, 828, 829, and 830 that forms the semicircular apertures for creating each cylindrical receptacle, may be connected via the frame structure by way of a set of curvatures 831, 832, and 833, opposite to each of the arches 827, 828, 829, and 830.

FIG. 11 illustrates a perspective view showing the exterior portion of a cage component 801, showing side supports or coupling arms 807 extending from the most external of vertical supports 811 perpendicular to and connecting the top frame 810 and the bottom frame 812 of the cage component 801 of cage 800, wherein each of the coupling arms 807 are configured to slidably register with channels on lateral frames or side panels of a rack suitable for receiving cage 800 or rather each cage component 801 and 802 separately therein (as will be discussed further below with reference to FIG. 14-17).

FIG. 12 illustrates a front view showing the exterior portion of a cage component 801. As mentioned above, each cage component 801 and 802 may have the same or substantially identical length such that a length L of top frame 810 is substantially the same or identical to a length of bottom frame 812. Similarly, an exterior length L2 (including a length of each coupling arm 807) of top frame 810 is substantially the same or identical to a length of bottom frame 812.

Finally turning to the last of this set of figures, FIG. 13 illustrates a side view of cage component 801, showing prongs 834 and 835 extending from top frame 810 and bottom frame 812, respectively, which for illustrative purposes are some of the prongs situated along cylindrical receptacle 806—and more specifically—only the prongs on cage component 801 that correspond to the prongs situated along cylindrical receptacle 806. From this view, it may be appreciated that each prong, wherein each prong includes a pair of legs extending from a top or bottom frame of the cage component and connected at a u-shaped bend substantially at the center region 836 of the cage component. Moreover, from this view, it may be appreciated that each prong, for example see prong 834, includes a first length L1 that extends from a frame of the cage component (in the case of prong 834 from top frame 810) inwardly and towards center region 836, and further includes a second length L2 that extends outwardly so as to flare away from vertical supports 811 perpendicular to and connecting the top frame 810 and the bottom frame 812 of the cage component 801 of cage 800, in order to form the spring element discussed above.

Figure 14:
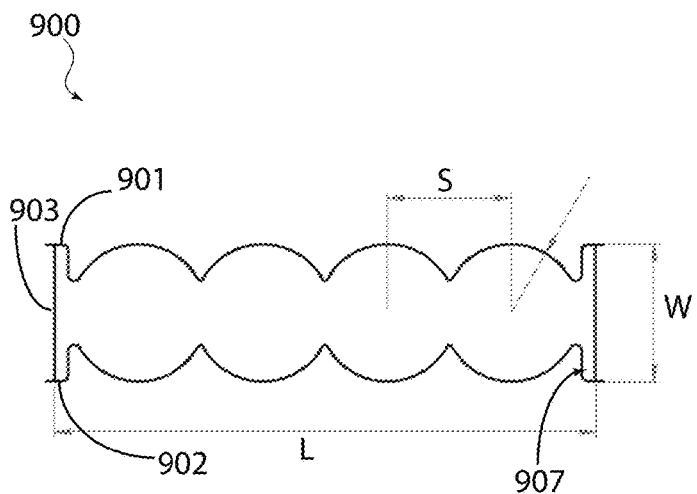
FIG. 14 illustrates a top view of a corn-support rack, in accordance with an exemplary embodiment of the present invention.
Figure 15:
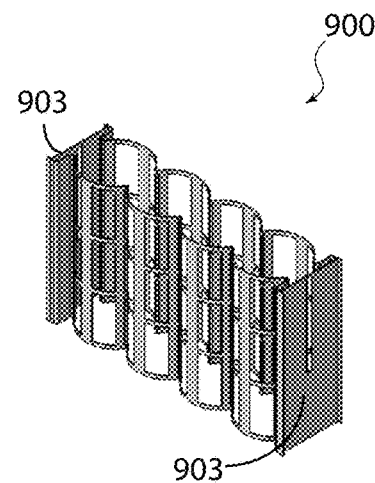
FIG. 15 illustrates a perspective view of a corn-support rack, in accordance with an exemplary embodiment of the present invention.
Figure 16:
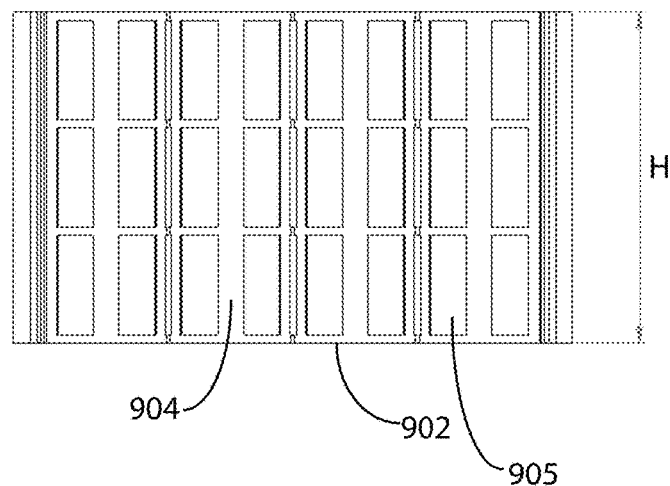
FIG. 16 illustrates a front view of a corn-support rack, in accordance with an exemplary embodiment of the present invention.
Figure 17:
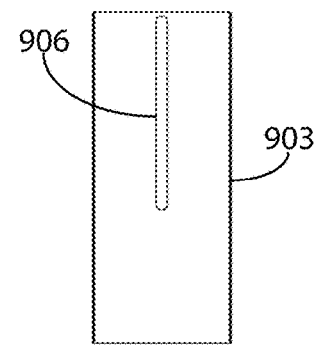
FIG. 17 illustrates a side view of a corn-support rack, in accordance with an exemplary embodiment of the present invention.

Turning now to the next set of figures, FIG. 14 illustrates a top view of a corn-support rack, in accordance with an exemplary embodiment of the present invention; FIG. 15 illustrates a perspective view thereof; FIG. 16 illustrates a front view thereof; and FIG. 17 illustrates a side view thereof. More specifically, rack 900 in accordance with the present invention is depicted, including heat element comprising of a heat element frame that includes a first set of semicircular apertures formed by a first series of connected curves or arches across a first length 901 of the heat element frame, and a second set of semicircular apertures formed by a second series of connected curves or arches across a second length 902 of the heat element frame. At terminal ends of each length 901 and 902, the heat element frame includes side panels 903, which connect and help support the heating element frame against a base of the corn roaster assembly. In an interior portion between each length 901 and 902 and behind each side panel 903, an aperture 907 (on either side) creates a channel for slidably receiving a portion of the cage components such as coupling arms 807 of cage components 801 and 802. In exemplary embodiments, each semicircular aperture formed by each of the arches along each length 901 and 902 are equal in length and are equidistant such that a distance S is constant between each of said arches. Similarly, in such embodiment, each length 901 and 901 are equal in length. FIG. 16 further shows how each length 901 and 902 (and particularly 902 is shown) has a frame 904 that includes several apertures 905 for receiving heating panels (not shown) which may be positioned outside therein. In some exemplary embodiments, the heating panels may be curved to fit within the apertures 905 of frame 904 and so that each heating panel wraps around the corn-support cage such as cage 800, creating a wavy heating element—or more specifically a first wavy heating element on one side and a second wavy heating element on the other side. In some exemplary embodiments, each of the heating panels may be embedded within the metallic structure that conducts electricity and thus heat to the heating panels. The heating panels may be made with any thermal conductive material such as metal or ceramic material. Furthermore, heating technologies may be implemented, including but not limited to infra-red heating technologies in which the ceramic is heated to a suitable temperature for providing the required heat to cook or roast the corn. FIG. 17 shows an exemplary slit or opening that may be provided for on each side panel 903 in order to allow for a lever (for example such as lever 45) to be disposed therein.

Figure 18:
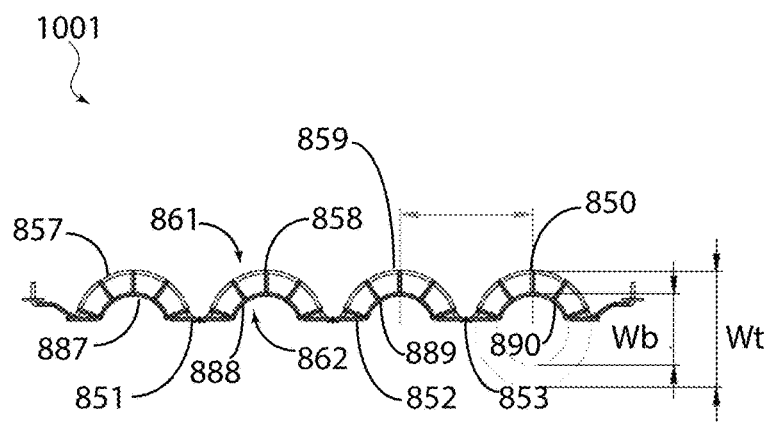
FIG. 18 illustrates a top view of a corn-support cage component, in accordance with an exemplary embodiment of the present invention.
Figure 19:
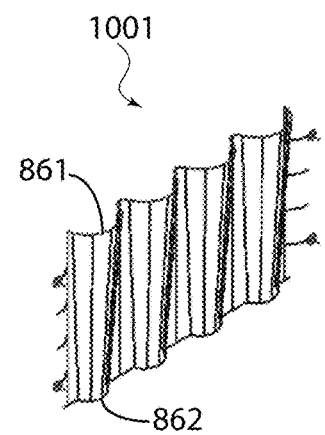
FIG. 19 illustrates a perspective view showing the exterior portion of a corn-support cage component, in accordance with an exemplary embodiment of the present invention.
Figure 20:
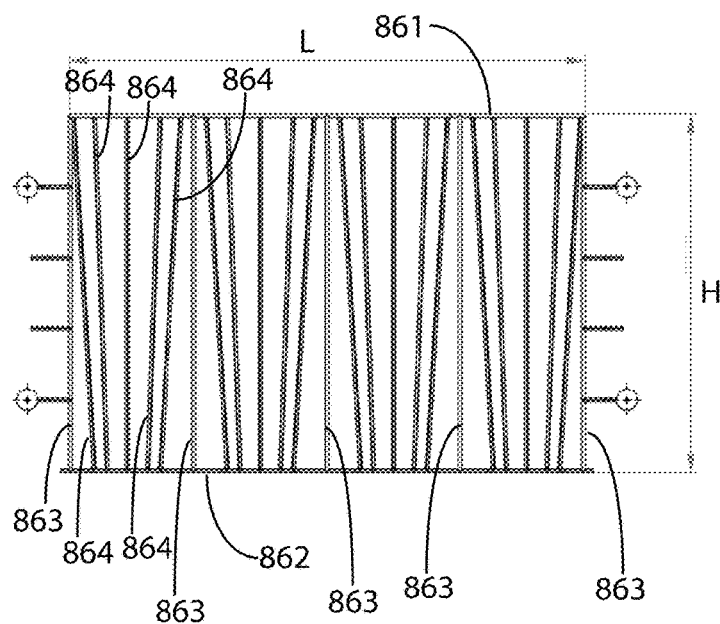
FIG. 20 illustrates a front view of a corn-support cage component, in accordance with an exemplary embodiment of the present invention.
Figure 21:
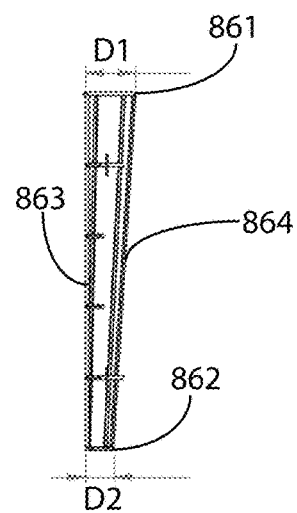
FIG. 21 illustrates a side view of a corn-support cage component, in accordance with an exemplary embodiment of the present invention.

The next set of figures depicts another exemplary embodiment of a corn-supporting cage. Turning to this last set of figures now, FIG. 18 illustrates a top view of a corn-support cage component, in accordance with an exemplary embodiment of the present invention; FIG. 19 illustrates a perspective view thereof; FIG. 20 illustrates a front view thereof; and FIG. 21 illustrates a side view thereof.

More specifically, these figures show metallic cage component 1001, of which there are typically two components (similar to components 801 and 802 of cage 800) and are substantially identical and as such only a single component is shown here. In such embodiment, each metallic cage component has a set of semicircular apertures formed by a second series of connected arches across a length of the metallic cage component, wherein each of a first and a second metallic cage components comprises: a top frame 861 including a plurality of top arches 857, 858, 859, and 850, wherein each top arch 857, 858, 859, and 850 of the top frame 861 has a first diameter, a bottom frame 862 including a plurality of bottom arches 887, 888, 889, and 890, wherein each bottom arch of the bottom frame 862 has a second diameter that is smaller than the first diameter, and a plurality of radiating vertical supports 864 connecting each of the plurality of bottom arches 887, 888, 889, and 890 with corresponding each of the plurality of top arches 857, 858, 859, and 850 of the top frame 861, such that the plurality of cylindrical receptacles in-between the first and second set of semicircular apertures of each cage component are conically shaped.

FIG. 19 shows the conical shapes of each cylindrical receptacle (or half of such) formed by cage component 1001. FIG. 20 depicts how the radiating vertical supports 864 connect top arches 857, 858, 859, and 850 of top frame 861, with bottom arches 887, 888, 889, and 890 of bottom frame 862, and shows each vertical support 863 that is perpendicular to top frame 861 and bottom frame 862 along the length of cage component 1001. FIG. 21, similarly shows these features, as well as the conical shape of each cylindrical receptacle, which is achieved in part by the greater size of the top arches in comparison to the bottom arches of the cage component. For example, this figure shows how a distance D1 (a height of the top arches) is greater than distance D2 for the height of the bottom arches.

Figure 22:
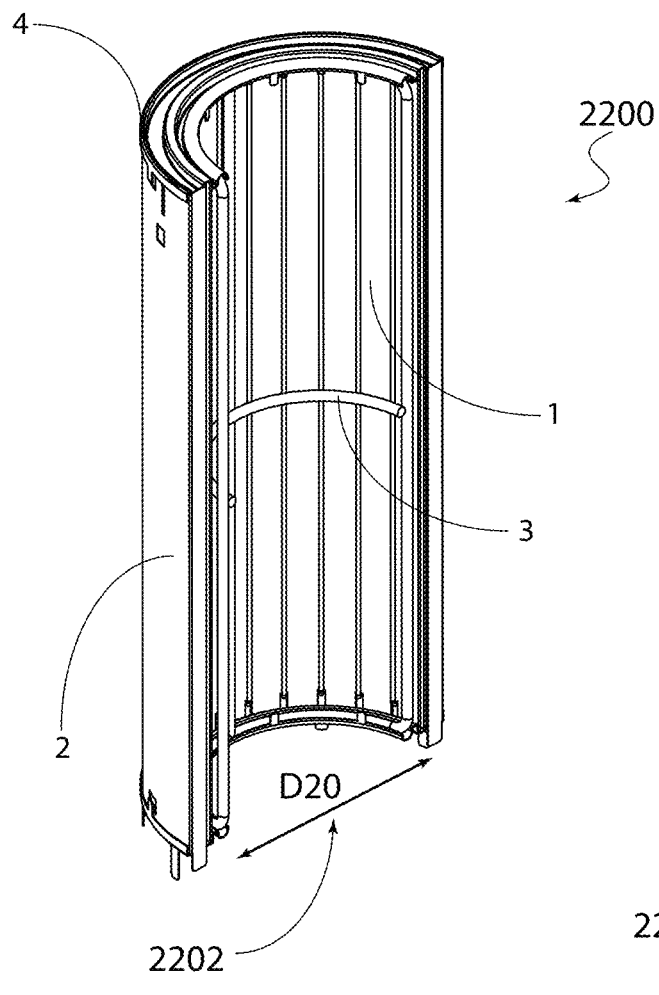
FIG. 22 illustrates a front view of a heat cartridge assembly in accordance with some exemplary embodiments of the present invention.
Figure 23:
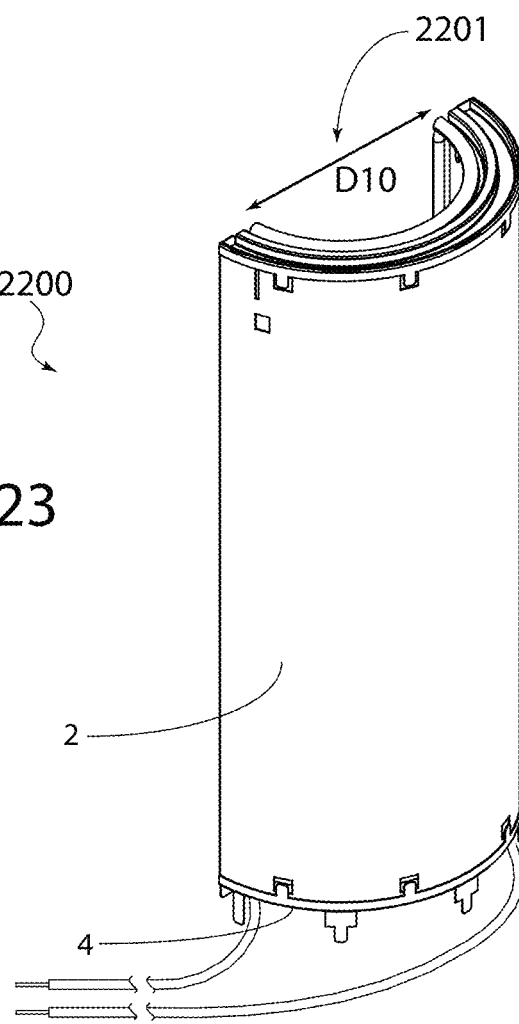
FIG. 23 illustrates a back view of a heat cartridge assembly in accordance with some exemplary embodiments of the present invention.
Figure 24:
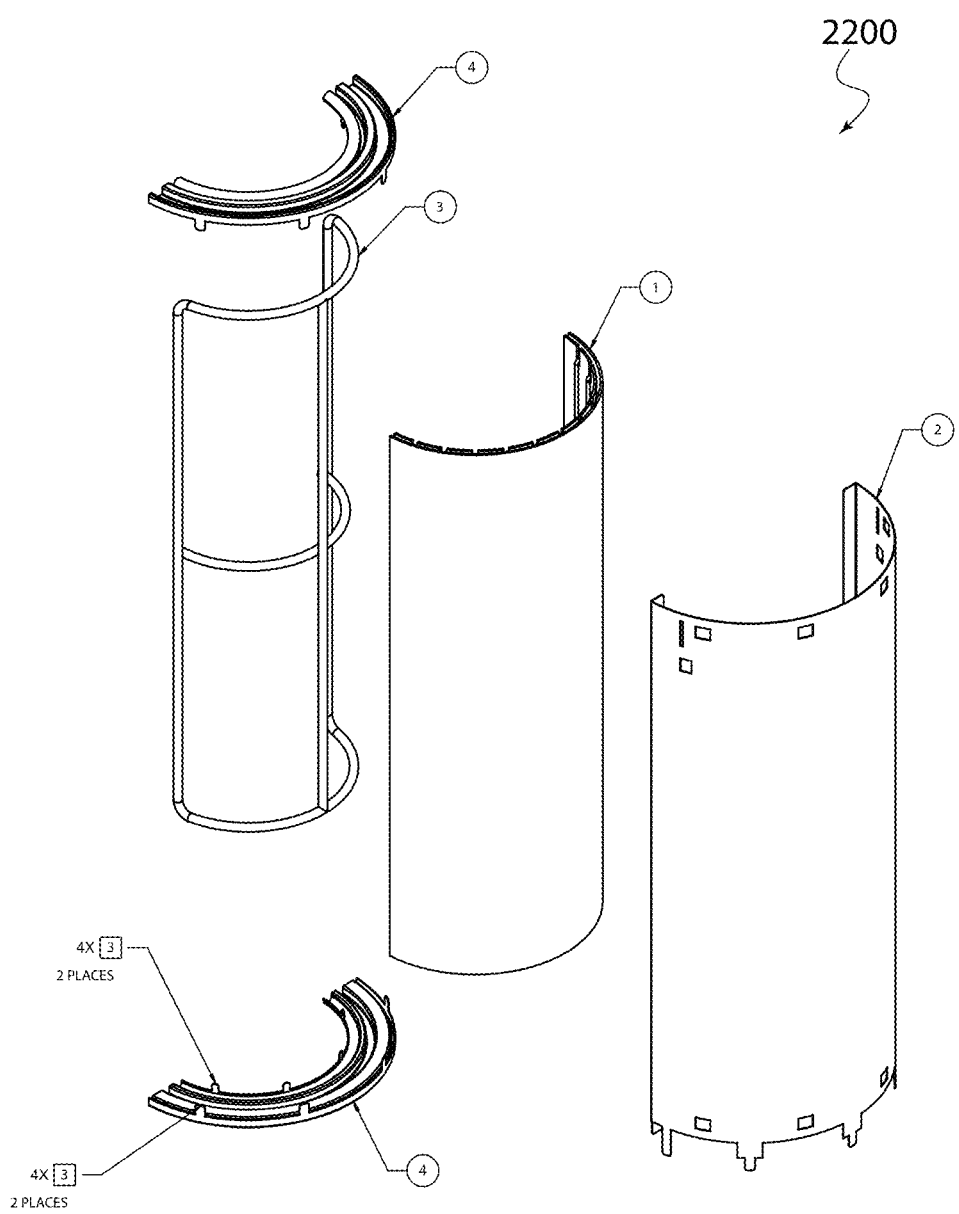
FIG. 24 illustrates an exploded view of a heat cartridge assembly in accordance with some exemplary embodiments of the present invention.

Turning now to the next set of figures, FIG. 22 illustrates a front view of a heat cartridge assembly in accordance with some exemplary embodiments of the present invention; FIG. 23 illustrates a back view of the heat cartridge assembly shown in FIG. 22; and FIG. 24 illustrates an exploded view thereof. More specifically, these views disclose an exemplary embodiment in which a heating element in accordance with the present invention may include one or more heating cartridge assemblies, such as heating cartridge assembly (HCA) 2200.

In some exemplary embodiments, HCA 2200 may comprise, a heating element assembly 1, a heat shield 2, a cage assembly 3, and base and top caps 4 configured to sandwich the heating element assembly 1 between the heat shield 2 and the cage assembly 3 of the HCA 2200.

Generally, a plurality of base caps 4 may be configured to be disposed over a surface of a corn roaster assembly in accordance with the present invention. Each base cap 4 may have a channel—which may be a semicircular channel—along an interior surface of the cap. Each channel of each cap may be configured to receive a portion of the other elements of the HCA 2200. For example, and without limiting the scope of the present invention, the channel may receive a portion of cage assembly 3 to which a semicircular heating element assembly 1 may be coupled to. Moreover, the semicircular channel may receive a portion of heat shield 3. As may be appreciated from the figures, the heating element assembly 1 is essentially sandwiched between the heat shield 2 and the cage assembly 3. Furthermore, a top cap 4 (similar to the base cap 4) is secured to a top portion of each of the components in a similar fashion (i.e. so that the heating element assembly 1 is essentially sandwiched between the heat shield 2 and the cage assembly 3) to secure each of the heating element assembly 1, heat shield 2, and cage assembly 3.

As may be appreciated from this view, all elements have a semicircular shape so that when the HCA is formed, a semicircular aperture is formed along an interior length of the HCA so that when a pair of HCAs are aligned with the interior length of each HCA facing each other, a cylindrical cavity is formed in between the respective HCAs. In this way, where a plurality of HCAs are aligned facing another plurality of HCAs, the respective cylindrical apertures formed between each pair of HCAs forms cylindrical receptacles configured to receive a cob of corn therein.

As with other embodiments mentioned above, some of the components of the HCA 2200 may include other shapes. For example, and without limiting the scope of the present invention, the shape of the heating element assembly 1 and heat shield 2 may be semi-cylindrical, while the shape of the cage assembly 3 may include a first arch at a top end of the cage assembly 3 having a first arch size, and a second arch at a bottom end of the cage assembly 3 having a second arch size (i.e. similar to the structure disclosed with reference to FIGS. 18-21 above wherein the aperture formed between a pair of HCAs would have a conical shape.

In an exemplary embodiment, however, the aperture formed is cylindrical having a uniform length so that the receptacles formed therein are cylindrical rather than conical receptacles. Particularly with reference to FIG. 22-FIG. 23, it may be appreciated that the shape of each cylindrical receptacle is achieved in part by the size of the top and bottom arches 2201 and 2202 having equal distances D10 (a height of the top arches) and distance D20 for the height of the bottom arches.

Accordingly, in some exemplary embodiments of the present invention, a corn roaster assembly may include: a cover that conceals a heating element defining a plurality of cylindrical receptacles, each of the plurality of cylindrical receptacles configured to receive a cob of corn, the heating element comprising a plurality of semicircular heating cartridge assemblies, each semicircular heating cartridge assembly (HCA) of the plurality of semicircular heating cartridge assemblies, including: a heating element assembly 1, a heat shield 2, a cage assembly 3, and a cap 4 configured to receive a portion of the heating element assembly 1, the heat shield 2, and the cage assembly 3, wherein the heating element assembly 1 is sandwiched between the heat shield 2 and the cage assembly 3 of the HCA.

Similarly, in some exemplary embodiments of the present invention, a corn roaster assembly may include: a cover 100 enclosing a cavity 102 having a plurality of cylindrical receptacles, each of the plurality of cylindrical receptacles configured to receive a cob of corn; a heating element formed from a plurality of semicircular heating cartridge assemblies, each heating cartridge assembly (HCA 2200) of the plurality of semicircular heating cartridge assemblies, including: a heating element assembly 1; a heat shield 2; a cage assembly 3; and caps 4 configured to receive a portion of the heating element assembly 1, the heat shield 2, and the cage assembly 3, wherein the heating element assembly 1 is sandwiched between the heat shield 2 and the cage assembly 3, and wherein complementary HCAs of the plurality of semicircular heating cartridge assemblies form each of the plurality of cylindrical receptacles.

Turning to the next set of figures, FIG. 25-FIG. 30 illustrate several views of a corn roaster assembly in accordance with one exemplary embodiment of the present invention. More specifically, this set of figures depict an exemplary corn roaster assembly in accordance with some embodiments of the present invention in which only two receptacles are disposed within a cavity of the corn roaster. For example, and without limiting the scope of the present invention, FIG. 25 depicts a top view of corn roaster assembly 3000; FIG. 26 depicts a side view of corn roaster assembly 3000; FIG. 27 depicts a bottom view thereof; FIG. 28 depicts a perspective view of corn roaster assembly 3000; FIG. 29 depicts a bottom exploded view of corn roaster assembly 3000 showing a crumb tray that may be configured to catch crumbs from roasted corn at a bottom region of the corn roaster assembly; and FIG. 30 depicts a front view thereof showing a potential dial and lever (similar in function to lever 405). Such embodiment may include any of the components discussed above with reference to other embodiments, including for example heating cartridge assemblies (HCAs) for providing a suitable heating element configured to optimize the roasting of corn.

Accordingly, in at least some exemplary embodiments of the present invention, a corn roaster assembly 3000, may include: a cover 3001 enclosing a cavity 3002 having a plurality of cylindrical receptacles wherein the plurality of cylindrical receptacles comprises two cylindrical receptacles 3003 and 3004, each of the two cylindrical receptacles 3003 and 3004 configured to receive a cob of corn; a heating element formed from a plurality of semicircular heating cartridge assemblies, each heating cartridge assembly (HCA) 2200 of the plurality of semicircular heating cartridge assemblies, including: a heating element assembly 1; a heat shield 2; a cage assembly 3; and caps 4 configured to receive a portion of the heating element assembly 1, the heat shield 2, and the cage assembly 3, wherein the heating element assembly 1 is sandwiched between the heat shield 2 and the cage assembly 3; wherein complementary HCAs 2200 of the plurality of semicircular heating cartridge assemblies form each of the two cylindrical receptacles 3003 and 3004.

In some exemplary embodiments, a lever 3005 may be disposed on a side of the cover 3001 in order to allow activation of the corn roaster and to lower corn cobs that may be placed within each HCA 2200 of corn roaster assembly 3000.

In some exemplary embodiments, a dial disposed 3006 on a side of the cover 3001 may be configured to allow a user to control a desired temperature for roasting corn. In some exemplary embodiments, a dial 3006 disposed on a side of the cover 3001 may be configured to allow a user to control a desired time for roasting corn. In some exemplary embodiments, a dial 3006 disposed on a side of the cover 3001 is configured to both control time and temperature for roasting corn.

In some exemplary embodiments, a crumb tray 3007 may be disposed along a bottom section of the cover 3001 of the corn roaster assembly 3000. Crumb tray 3007 may cover a portion of a bottom surface 3008 of the cover 3001 of the corn roaster assembly 3000, and may be configured to slide out, unfasten, or otherwise be uncoupled from a portion of a bottom section of the cover of the corn roaster assembly 3000, without deviating from the scope of the present invention.

Figure 31:
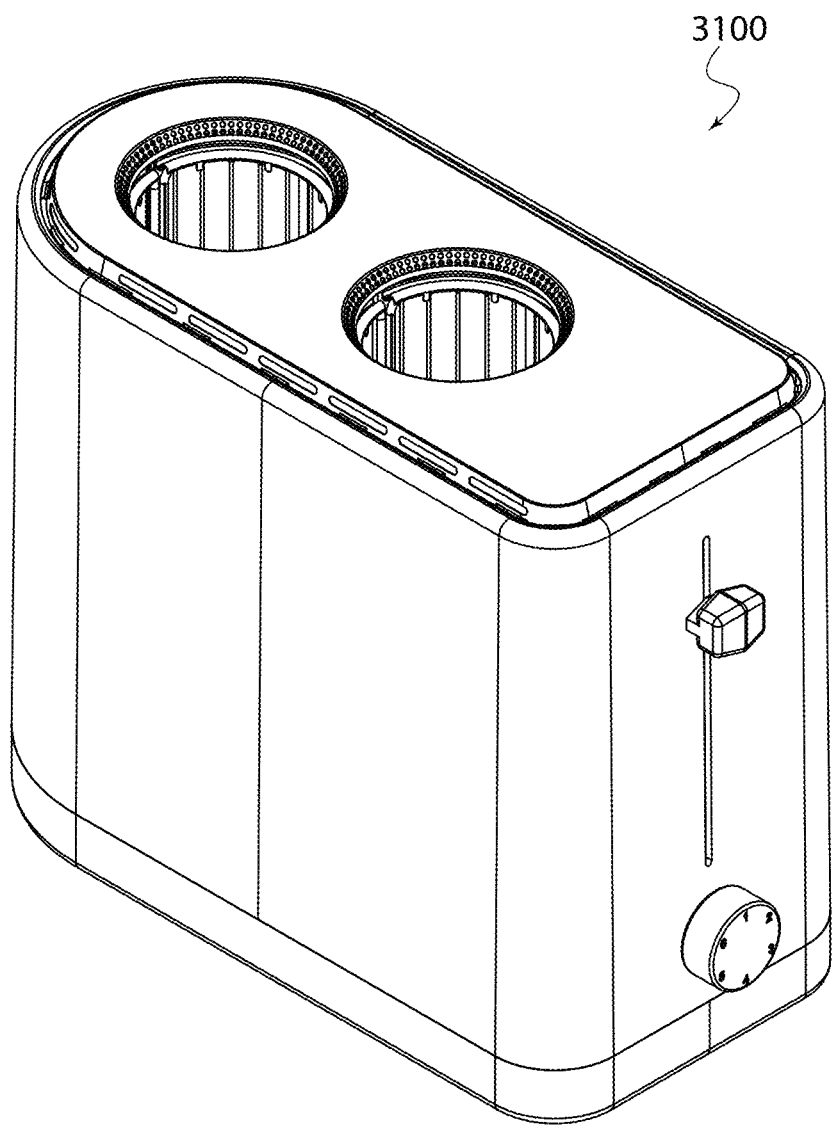
FIG. 31 illustrates a perspective view of a corn roaster assembly in accordance with one exemplary embodiment of the present invention.

Now turning to the next figure, FIG. 31 illustrates a perspective view of a corn roaster assembly in accordance with one exemplary embodiment of the present invention. More specifically, FIG. 31 depicts a perspective view of corn roaster assembly 3100, which includes a cover having a curved end opposite to the end that includes a lever and control dial. Naturally, other designs for the cover including other shapes, whether angular, rectangular, squared, with or without various curves, may be employed with a corn roaster assembly in accordance with the present invention, without limitation, and a person of ordinary skill in the art will appreciate that various aesthetically pleasing covers may be implemented accordingly.

Figure 32:
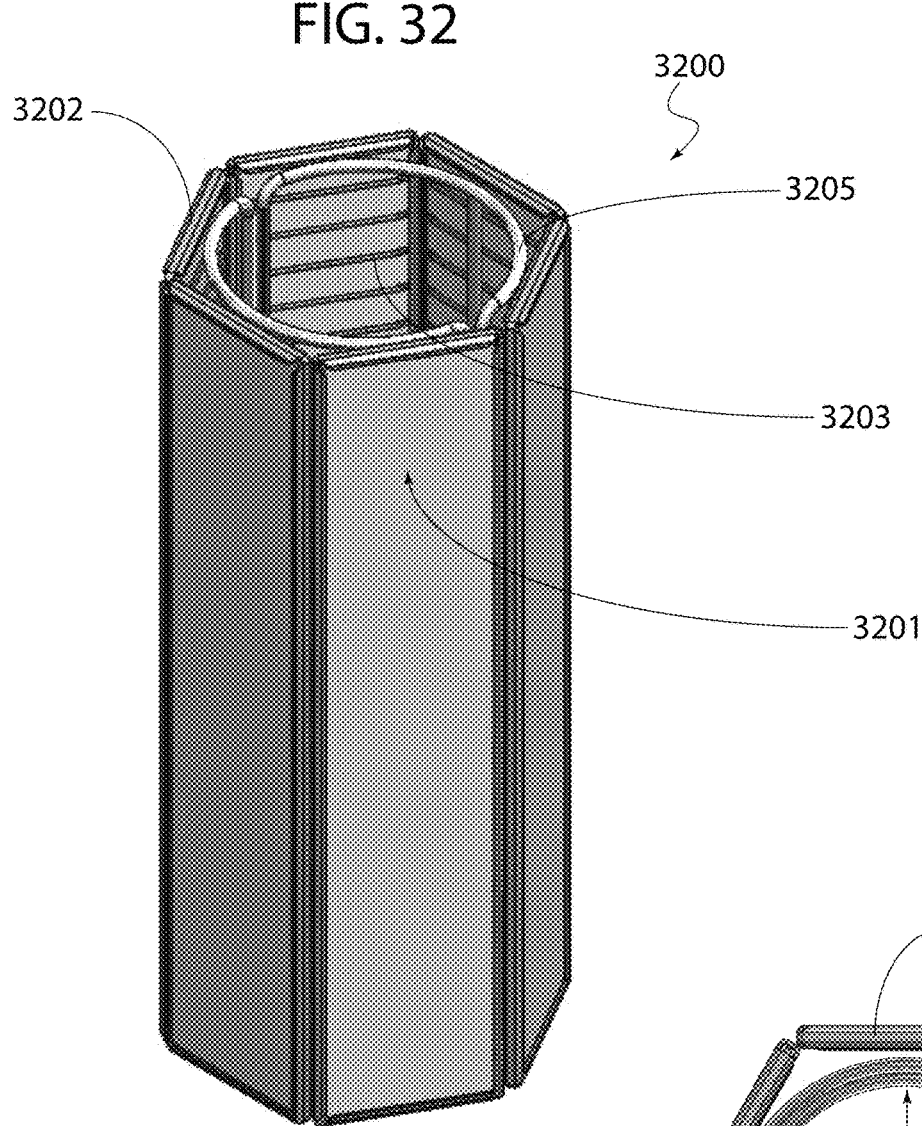
FIG. 32 illustrates a perspective view of a heat cartridge assembly in accordance with some exemplary embodiments of the present invention.
Figure 33:
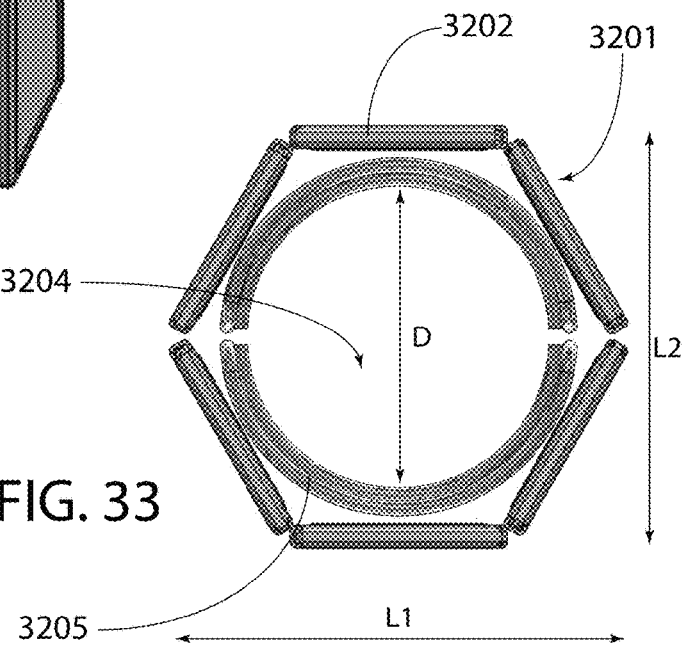
FIG. 33 illustrates a top view of a heat cartridge assembly in accordance with some exemplary embodiments of the present invention.
Figure 34:
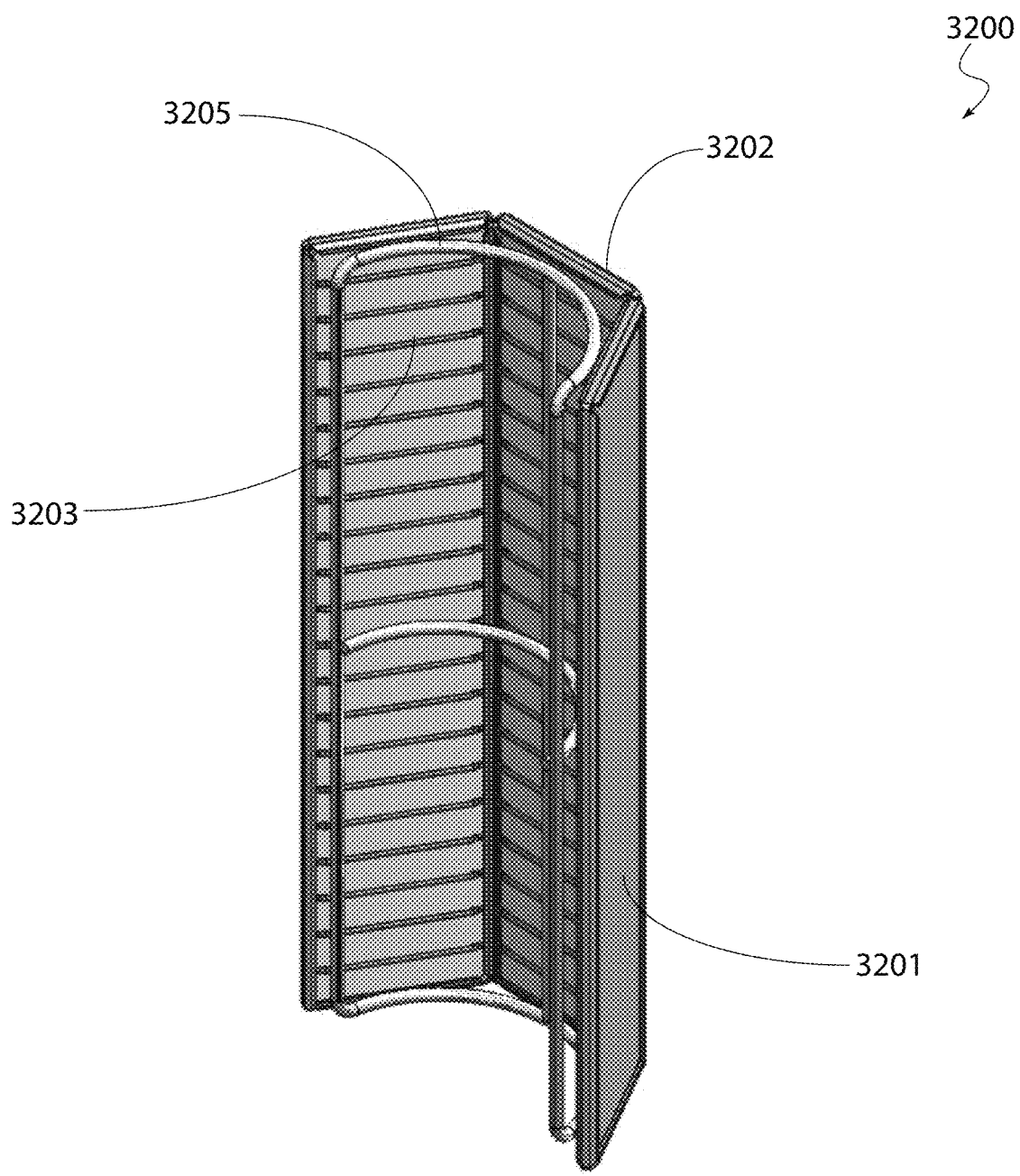
FIG. 34 illustrates a cross-sectional view of a heat cartridge assembly in accordance with some exemplary embodiments of the present invention.
Figure 35:
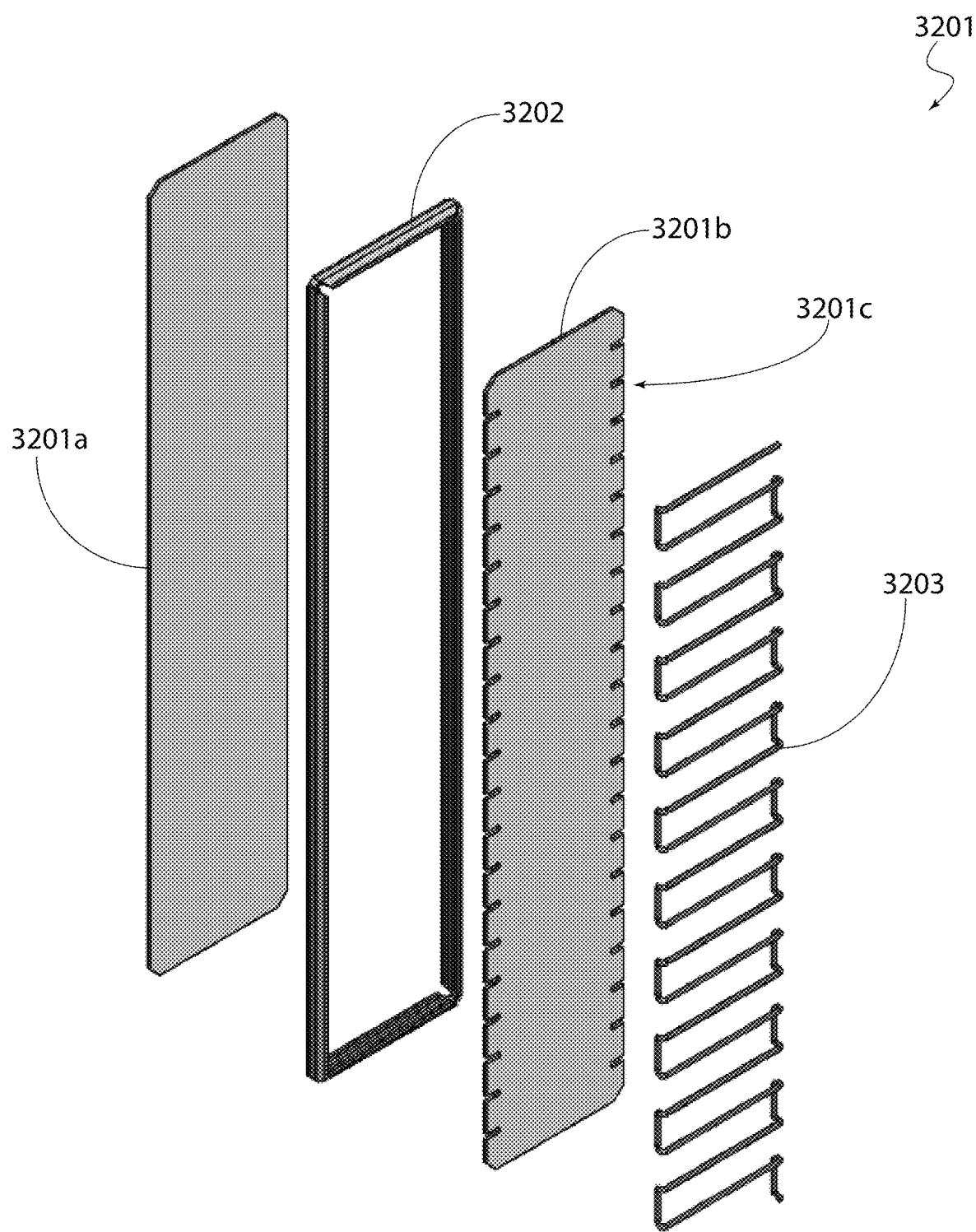
FIG. 35 illustrates an exploded view of a heat cartridge assembly in accordance with some exemplary embodiments of the present invention.

Turning now to the last set of figures, FIG. 32 illustrates a perspective view of a heat cartridge assembly in accordance with some exemplary embodiments of the present invention; FIG. 33 illustrates a top view thereof; FIG. 34 illustrates a cross-sectional view thereof; and FIG. 35 illustrates an exploded view thereof. More specifically, these views disclose an exemplary embodiment in which a heating element in accordance with the present invention may include one or more heating cartridge assemblies, such as heating cartridge assembly (HCA) 3200, which includes a polygonal configuration rather than a circular shape as with exemplary embodiments illustrated in other figures.

In some exemplary embodiments, HCA 3200 may comprise, a plurality of heating panels 3201, each including an internal panel 3201a (see FIG. 35), a metal casing or heat shield 3202 and a heating element 3203 coupled to portions of the internal panel 3201a of the heating panels 3201, the metal casing or heat shields 3202 configured to surround and sandwich the panels 3201 (including internal panel 3201a) to keep heat within a chamber 3204 for reducing the amount of heat loss and prevent an outer body of the device undesirably hot. The chamber 3204 may include a rack or cage assembly 3205 configured to receive and secure a cob of corn within chamber 3204 of the HCA 3200.

In exemplary embodiments such as the ones shown in these figures, each of the plurality of heating panels 3201 may be arranged so that they form a polygonal shape. For example, and without limiting the scope of the present invention, in some exemplary embodiments, the a plurality of heating panels 3201 are arranged to form the perimeter of a square; in some exemplary embodiments, the a plurality of heating panels 3201 are arranged to form the perimeter of a hexagon; any other polygonal shape may be employed without deviating from the scope of the present invention, including for example a rectangular perimeter or a squared perimeter.

As shown, the plurality of heating panels 3201 are arranged to form the perimeter of a hexagon. This shape was found to be beneficial for supplying an adequate heat that properly roasts the corn on the cob within the chamber 3204 but adequately dissipates heat to prevent a housing or casing that surrounds HCA 3200 from getting to hot. In some exemplary embodiments, the hexagonal shape may include a chamber 3204 that houses a circular or cylindrical cage assembly 3205 configured to receive and secure a cob of corn within chamber 3204 of the HCA 3200, wherein the cylindrical cage assembly 3205 has a diameter D. In some exemplary embodiments, the diameter D is approximately 34 mm in length. In some exemplary embodiments, the hexagonal shape may include a first length L1 and a second length L2. In exemplary embodiments, the length L1 may be 93 mm and the length L2 may be 86 mm. Of course, other sizes and dimensions may be possible without deviating from the scope of the present invention.

In the cross-sectional view of FIG. 34, it may be appreciated that a heating element 3203 is embedded onto portions of the body of each of the heating panels 3201, which dissipates power for producing the desired heat within chamber 3204 of the HCA 3200. In exemplary embodiments, heating elements dissipate about 135 W of power. In exemplary embodiments such as the one shown in these views, the heating element may comprise of a wire forming a plurality of parallel and horizontal lines in a zig-zag shape, each of the horizontal lines spaced apart by a vertical portion of the wire that is perpendicular to the horizontal portions of the wire. In exemplary embodiments, each of the horizontal lengths or portions of the wire may be spaced apart by approximately 10 mm. It should be noted that in other exemplary embodiments, the wire making up heating element 3203 may be coupled to heating panels 3201 (or a portion thereof) so that the wire is longitudinally (or vertically) oriented rather than horizontally.

This exemplary configuration may also be appreciated from the exploded view of FIG. 35. From tis view, it may be appreciated that the metal casing or heat shields 3202 surround the panels 3201 and also securely sandwich panels 3201 with internal panels 3201a. Internal panels 3201a may include a plurality of apertures 3201b, from which the wire that forms heating element 3203 may be securely coupled. In exemplary embodiments, while smaller vertical portions of the wire are secured between sets of apertures 3201b, each of the horizontal and parallel lengths of the wire of heating element 3203 are disposed towards an interior of HCA 3200, or more specifically, towards chamber 3204.

An improved corn roaster has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A corn roaster assembly, comprising:
   a cover enclosing a cavity having a plurality of cylindrical receptacles, each of the plurality of cylindrical receptacles configured to receive a cob of corn; and
   a plurality of heating cartridge assemblies within each of the cylindrical receptacles, each heating cartridge assembly (HCA) of the plurality of heating cartridge assemblies, including:
      a cylindrical cage assembly adapted to secure at least a portion of the cob of corn; and
      a plurality of heating panels situated around the cylindrical cage assembly to form a heating chamber configured to roast the cob of corn, wherein each HCA further includes a metal casing around each of the plurality of heating panels, and each of the heating panels of each HCA includes an external panel and an internal panel, and wherein the heating panels include a heating element coupled to an interior region of the heating panels facing the heating chamber.

2. The corn roaster assembly of claim 1, wherein the plurality of heating panels situated around the cylindrical cage assembly form a hexagonal perimeter around the heating chamber configured to roast the cob of corn.

3. The corn roaster assembly of claim 1, wherein the plurality of heating panels situated around the cylindrical cage assembly form a circumference around the heating chamber configured to roast the cob of corn.

4. The corn roaster assembly of claim 1, wherein the heating panels include:
   an internal panel facing the heating chamber;
   an external panel;
   a metal casing sandwiching the external panel and the internal panel; and
   a heating element coupled to the interior panel facing the heating chamber, wherein the heating element is a wire coupled to apertures on the perimeter of the internal panel.

5. The corn roaster assembly of claim 1, wherein the plurality of heating panels comprise a heating element situated outside of a circumference of the cylindrical cage assembly.

6. The corn roaster assembly of claim 1, wherein the plurality of heating panels comprise a heating element including a wire that is disposed in a zig-zag configuration.

7. A corn roaster assembly, comprising:
   a cover enclosing a cavity having a plurality of cylindrical receptacles, each of the plurality of cylindrical receptacles configured to receive a cob of corn; and
   a plurality of heating cartridge assemblies within each of the cylindrical receptacles, each heating cartridge assembly (HCA) of the plurality of heating cartridge assemblies, including:
      a cylindrical cage assembly adapted to secure at least a portion of the cob of corn; and
      a plurality of heating panels situated around the cylindrical cage assembly to form a heating chamber configured to roast the cob of corn;
   wherein the plurality of heating panels situated around the cylindrical cage assembly form a hexagonal perimeter around the heating chamber configured to roast the cob of corn, and wherein the heating panels include a heating element coupled to an interior region of the heating panels facing the heating chamber, and each of the heating panels of each HCA includes an external panel and an internal panel, and wherein the plurality of heating panels comprise a heating element including a wire that is disposed in a zig-zag configuration.

8. The corn roaster assembly of claim 7, wherein each HCA further includes a metal casing around each of the plurality of heating panels, wherein the metal casing sandwiches the external panel and the internal panel of the heating panels.

9. The corn roaster assembly of claim 7, wherein the plurality of heating panels comprise a heating element situated outside of a circumference of the cylindrical cage assembly.

10. The corn roaster assembly of claim 7, wherein the heating panels include:
    an internal panel facing the heating chamber;
    an external panel;
    a metal casing sandwiching the external panel and the internal panel; and
    a heating element coupled to the interior panel facing the heating chamber, wherein the heating element is a wire coupled to apertures on the perimeter of the internal panel.

11. A corn roaster assembly, comprising:
    a cover enclosing a cavity having a plurality of cylindrical receptacles, each of the plurality of cylindrical receptacles configured to receive a cob of corn; and
    a plurality of heating cartridge assemblies within each of the cylindrical receptacles, each heating cartridge assembly (HCA) of the plurality of heating cartridge assemblies, including:
       a cylindrical cage assembly adapted to secure at least a portion of the cob of corn; and
       a plurality of heating panels situated around the cylindrical cage assembly to form a heating chamber configured to roast the cob of corn;
    wherein the plurality of heating panels situated around the cylindrical cage assembly form a circumference around the heating chamber configured to roast the cob of corn, wherein each HCA further includes a metal casing around each of the plurality of heating panels, and each of the heating panels of each HCA includes an external panel and an internal panel, and wherein the heating panels include a heating element coupled to an interior region of the heating panels facing the heating chamber, and wherein the heating panels include:

an internal panel facing the heating chamber;

an external panel;

a metal casing sandwiching the external panel and the internal panel; and a heating element coupled to the interior panel facing the heating chamber, wherein the heating element is a wire coupled to apertures on the perimeter of the internal panel.

* * * * *